US007945677B2

(12) United States Patent
Fleischer et al.

(10) Patent No.: US 7,945,677 B2
(45) Date of Patent: May 17, 2011

(54) CONNECTION MANAGER CAPABLE OF SUPPORTING BOTH DISTRIBUTED COMPUTING SESSIONS AND NON DISTRIBUTED COMPUTING SESSIONS

(75) Inventors: Christian Fleischer, Mannheim (DE); Oliver Luik, Wiesloch (DE); Georgi Stanev, Sofia (BG)

(73) Assignee: SAP AG, Walldorf (DE)

( * ) Notice: Subject to any disclaimer, the term of this patent is extended or adjusted under 35 U.S.C. 154(b) by 928 days.

(21) Appl. No.: 11/221,243

(22) Filed: Sep. 6, 2005

(65) Prior Publication Data
US 2007/0055781 A1   Mar. 8, 2007

(51) Int. Cl.
*G06F 15/16* (2006.01)
*G06F 15/167* (2006.01)
*G06F 3/00* (2006.01)

(52) U.S. Cl. ........ 709/227; 709/203; 709/213; 709/219; 719/312

(58) Field of Classification Search .......... 709/227–229, 709/217–219, 203, 212–215; 702/32, 35; 707/1–9; 718/105, 100; 719/312
See application file for complete search history.

(56) References Cited

U.S. PATENT DOCUMENTS

| | | | | |
|---|---|---|---|---|
| 5,497,463 A * | 3/1996 | Stein et al. | | 709/203 |
| 5,745,703 A * | 4/1998 | Cejtin et al. | | 709/238 |
| 6,223,202 B1 * | 4/2001 | Bayeh | | 718/102 |
| 6,401,109 B1 * | 6/2002 | Heiney et al. | | 718/1 |
| 6,687,702 B2 * | 2/2004 | Vaitheeswaran et al. | | 1/1 |
| 6,766,515 B1 * | 7/2004 | Bitar et al. | | 718/100 |
| 7,127,713 B2 * | 10/2006 | Davis et al. | | 717/177 |
| 7,177,823 B2 | 2/2007 | Lam et al. | | |
| 7,191,170 B2 | 3/2007 | Ganguly et al. | | |
| 7,251,815 B2 * | 7/2007 | Donovan et al. | | 718/105 |
| 7,305,495 B2 | 12/2007 | Carter | | |
| 7,421,702 B1 * | 9/2008 | Margulis et al. | | 719/316 |
| 7,444,536 B1 * | 10/2008 | Jairath | | 714/4 |
| 7,735,097 B2 * | 6/2010 | Kovachka-Dimitrova et al. | | 719/328 |
| 2002/0174097 A1 * | 11/2002 | Rusch et al. | | 707/1 |
| 2002/0198923 A1 | 12/2002 | Hayes | | |
| 2003/0037178 A1 * | 2/2003 | Vessey et al. | | 709/319 |
| 2003/0046441 A1 * | 3/2003 | Rau et al. | | 709/315 |
| 2003/0135568 A1 * | 7/2003 | Kim et al. | | 709/206 |
| 2003/0204645 A1 * | 10/2003 | Sharma et al. | | 709/328 |
| 2004/0133691 A1 * | 7/2004 | Shimada | | 709/229 |
| 2005/0044551 A1 * | 2/2005 | Sodhi | | 719/312 |
| 2005/0086237 A1 * | 4/2005 | Monnie et al. | | 707/100 |
| 2005/0155011 A1 * | 7/2005 | Heik et al. | | 717/100 |

(Continued)

OTHER PUBLICATIONS

Lindsay, S., "CORBA," Senior Software Engineer, Mercator Software, pp. 13.

(Continued)

*Primary Examiner* — Carl Colin
*Assistant Examiner* — Catherine Thiaw
(74) *Attorney, Agent, or Firm* — Schwegman, Lundberg & Woessner, P.A.

(57) ABSTRACT

A method is described that involves establishing a connection over a shared memory between a connection manager and a worker node. The shared memory is accessible to multiple worker nodes. Then sending, from the connection manager to the worker node over the connection, a first request containing a method call to a remote object on the worker node. Also sending, from the connection manager to the worker node over the connection, a second request containing a second method call to a second remote object on the worker node.

17 Claims, 13 Drawing Sheets

U.S. PATENT DOCUMENTS

| | | | |
|---|---|---|---|
| 2005/0188055 A1* | 8/2005 | Saletore | 709/218 |
| 2005/0188068 A1 | 8/2005 | Kilian | |
| 2005/0246717 A1* | 11/2005 | Poole et al. | 719/316 |
| 2006/0130063 A1 | 6/2006 | Kilian et al. | |
| 2006/0143608 A1 | 6/2006 | Dostert et al. | |
| 2006/0143619 A1* | 6/2006 | Galchev et al. | 719/315 |
| 2006/0282509 A1* | 12/2006 | Kilian et al. | 709/217 |
| 2007/0027877 A1* | 2/2007 | Droshev et al. | 707/10 |
| 2007/0027896 A1* | 2/2007 | Newport et al. | 707/102 |

OTHER PUBLICATIONS

SUN.COM, "Marshalling Your Data," pp. 1, http://java.sun.com/xml/jaxp/dist/1.0.1/docs/binding/Bindings2Marshall.html.

Keahey, K., "A Brief Tutorial on CORBA," pp. 5, http://www.cs.indiana.edu/~kksiazek/tuto.html.

Golm, M., Components of an ORB, 1997-2000, pp. 6.

University of Manchester, "Lecture 20: CORBA," 2004, pp. 20.

Anonymous, "P4 Service Overview," pp. 4, http://www47.abb.de/StartPage/documents/dev/33.html.

Techtarget.Com, "IIOP—a Whatis.com definition-see also: Internet Inter-ORB Control," Jul. 30, 2001, pp. 3, http://searchsmb.techtarget.com/sDefinitiono/0,,sid44_gci214019,00.html.

Webopedia.Com, "What is CORBA?—A Word Definition From the Webopedia Computer Dictionary," Apr. 20, 2004, pp. 1, http://www.webopedia.com/TERM/C/CORBA.html.

Webopedia.Com, "What is IIOP?—A Word Definition From the Webopedia Computer Dictionary," Aug. 21, 2001, pp. 1, http://www.webopedia.com/TERM/I/IIOP.html.

Webopedia.Com, "What is HTTP?—A Word Definition From the Webopedia Computer Dictionary," Feb. 18, 2004, pp. 2, http://www.webopedia.com/TERM/H/HTTP.html.

Newport, B., EJB Consultant, "RMI/IIOP, nice idea but the reality is turning out to be different," 2004, pp. 6, http://www.theserverside.com/articles/article.tss?1=RMI-IIOP.

Sun Microsystems, "8.6 The Operation Class," Java Remote Method Invocation: 8-Stub/Skeleton Interfaces, 1997-1999, pp. 1, http://java.sun.com/j2se/1.3/docs/guide/rmi/spec/rmi-stubs7.html.

Sun Microsystems, "8.5 The Skeleton Interface," Java Remote Method Invocation, Java Remote Method Invocation: 8-Stub/Skeleton Interfaces, 1997-1999, pp. 1, http://java.sun.com/j2se/1.3/docs/guide/rmi/spec/rmi-stubs6.html.

Sun Microsystems, "8.4 The ServerRef Interface," Java Remote Method Invocation, Java Remote Method Invocation: 8-Stub/Skeleton Interfaces, 1997-1999, pp. 1, http://java.sun.com/j2se/1.3/docs/guide/rmi/spec/rmi-stubs5.html.

Sun Microsystems, "8.3 The RemoteRef Interface," Java Remote Method Invocation, Java Remote Method Invocation: 8-Stub/Skeleton Interfaces, 1997-1999, pp. 3, http://java.sun.com/j2se/1.3/docs/guide/rmi/spec/rmi-stubs4.html.

Sun Microsystems, "8.2 The RemoteCall Interface," Java Remote Method Invocation, Java Remote Method Invocation: 8-Stub/Skeleton Interfaces, 1997-1999, pp. 1, http://java.sun.com/j2se/1.3/docs/guide/rmi/spec/rmi-stubs3.html.

Sun Microsystems, "8.1 The RemoteStubClass," Java Remote Method Invocation, Java Remote Method Invocation: 8-Stub/Skeleton Interfaces, 1997-1999, pp. 2, http://java.sun.com/j2se/1.3/docs/guide/rmi/spec/rmi-stubs2.html.

Techtarget.Com, "Marshalling—a Whatis.com definition," pp. 1, http://whatis.techtarget.com/definition/0,,sid9_gci212529,00.html.

Minton, G., "IIOP Specification: A Closer Look," 1997, pp. 10, http://www.blackmagic.com/people/gabe/iiop.html.

Sun Microsystems, Inc., "Java RMI over IIOP," 1994-2004, pp. 1, http://java.sun.com/products/rmi-iiop/.

SAP.COM, "RMI-P4(SAP Library)," pp. 1, http://help.sap.com/saphelp_webas630/helpdata/en/4b/fabc3d8af79633e10000000a11405a/c....

CORBA, "Lecture 15," Feb. 21, 2005, pp. 7.

SAP.COM, "Failover for Clustered RMI-P4 Remote Objects (SAP Library)," pp. 3, http://help.sap.com/saphelp_nw04/helpdata/en/f6/4ef11ab3a52f408aa8a133f33d6cfl/conten....

Baclawski, K., "Java RMI Tutorial," 1998, pp. 9, http://www.ccs.new.edu/home/kenb/com3337/rmi_tut.html.

Sun Microsystems, Inc., "An Overview of RMI Applications," 1995-2000, pp. 4, http://java.sun.com/docs/books/tutorial/rmi/overview.html.

CS.RICE.EDU, "Distributed Program Construction Lecture 5:RMI, CORBA," 1999, pp. 22, http://www.cs.rice.edu/~druschel/comp413/lectures/rmi-corba.html.

SUN.COM, "Marshalling Your Data," pp. 1, http://java.sun.com/xml/jaxp/dist/1.0.1/docs/binding/Bindings2Marshall.html, retrieval date Mar. 2005.

Keahey, K., "A Brief Tutorial on CORBA," pp. 5, http://www.cs.indiana.edu/~kksiazek/tuto.html, retrieval date Mar. 2005.

Anonymous, "P4 Service Overview," pp. 4, http://www47.abb.de/StartPage/documents/dev/33.html, retrieval date Mar. 2005.

Techtarget.Com, "Marshalling—a Whatis.com definition," pp. 1, http://whatis.techtarget.com/definition/0,,sid9_gci212529,00.html, retrieval date Mar. 2005.

SAP.COM, "RMI-P4(SAP Library)," pp. 1, http://help.sap.com/saphelp_webas630/helpdata/en/4b/fabc3d8af79633e10000000a11405a/c..., retrieval date Mar. 2005.

SAP.Com, "Failover for Clustered RMI-P4 Remote Objects (SAP Library)," pp. 3, http://help.sap.com/saphelp_nw04/helpdata/en/f6/4ef11ab3a52f408aa8a133f33d6cfl/conten..., retrieval date Mar. 2005.

* cited by examiner

CONNECTION MANAGER CAPABLE OF SUPPORTING BOTH DISTRIBUTED COMPUTING SESSIONS AND NON DISTRIBUTED COMPUTING SESSIONS

FIELD OF INVENTION

The field of invention relates generally to the software arts; and, more specifically, to the implementation of a connection manager capable of supporting both distributed computing sessions and non distributed computing sessions.

BACKGROUND

Prior Art Application Server

Even though standards-based application software (e.g., Java based application software) has the potential to offer true competition at the software supplier level, legacy proprietary software has proven reliability, functionality and integration into customer information systems (IS) infrastructures. Customers are therefore placing operational dependency on standards-based software technologies with caution. Not surprisingly, present day application software servers tend to include both standard and proprietary software suites, and, often, "problems" emerge in the operation of the newer standards-based software, or interoperation and integration of the same with legacy software applications.

The prior art application server 100 depicted in FIGS. 1a,b provides a good example. FIG. 1a shows a prior art application server 100 having both an ABAP legacy/proprietary software suite 103 and a Java J2EE standards-based software suite 104. A connection manager 102 routes requests (e.g., HTTP requests, HTTPS requests) associated with "sessions" between server 100 and numerous clients (not shown in FIG. 1) conducted over a network 101. A "session" can be viewed as the back and forth communication over a network 101 between a pair of computing systems (e.g., a particular client and the server).

The back and forth communication typically involves a client ("client") sending a server 100 ("server") a "request" that the server 100 interprets into some action to be performed by the server 100. The server 100 then performs the action and if appropriate returns a "response" to the client (e.g., a result of the action). Often, a session will involve multiple, perhaps many, requests and responses. A single session through its multiple requests may invoke different application software programs.

For each client request that is received by the application server's connection manager 102, the connection manager 102 decides to which software suite 103, 104 the request is to be forwarded. If the request is to be forwarded to the proprietary software suite 103, notification of the request is sent to a proprietary dispatcher 105, and, the request itself is forwarded into a request/response shared memory 106. The proprietary dispatcher 105 acts as a load balancer that decides which one of multiple proprietary worker nodes $107_1$ through $107_L$ are to actually handle the request.

A worker node is a focal point for the performance of work. In the context of an application server that responds to client-server session requests, a worker node is a focal point for executing application software and/or issuing application software code for downloading. The term "working process" generally means an operating system (OS) process that is used for the performance of work and is also understood to be a type of worker node. For convenience, the term "worker node" is used throughout the present discussion.

When a particular proprietary worker node has been identified by dispatcher 105 for handling the aforementioned request, the request is transferred from the request/response shared memory 106 to the identified worker node. The identified worker node processes the request and writes the response to the request into the request/response shared memory 106. The response is then transferred from the request/response shared memory 106 to the connection manager 102. The connection manager 102 sends the response to the client via network 101.

Note that the request/response shared memory 106 is a memory resource that each of worker nodes $107_1$ through $107_L$ has access to (as such, it is a "shared" memory resource). For any request written into the request/response shared memory 106 by the connection manager 102, the same request can be retrieved by any of worker nodes $107_1$ through $107_L$. Likewise, any of worker nodes $107_1$ through $107_L$ can write a response into the request/response shared memory 106 that can later be retrieved by the connection manager 102. Thus the request/response shared memory 106 provides for the efficient transfer of request/response data between the connection manager 102 and the multiple proprietary worker nodes $107_1$ through $107_L$.

If the request is to be forwarded to the standards based software suite 104, notification of the request is sent to the dispatcher 108 that is associated with the standards based software suite 104. As observed in FIG. 1a, the standards-based software suite 104 is a Java based software suite (in particular, a Java 2 Enterprise Edition (J2EE) suite) that includes multiple worker nodes $109_1$ through $109_N$.

A Java Virtual Machine is associated with each worker node for executing the worker node's abstract application software code. For each request, dispatcher 108 decides which one of the N worker nodes is best able to handle the request (e.g., through a load balancing algorithm). Because no shared memory structure exists within the standards based software suite 104 for transferring client session information between the connection manager 102 and the worker nodes $109_1$ through $109_N$, separate internal connections have to be established to send both notification of the request and the request itself to the dispatcher 108 from connection manager 102 for each worker node. The dispatcher 108 then forwards each request to its proper worker node.

FIG. 1b shows a more detailed depiction of the J2EE worker nodes $109_1$ through $109_N$ of the prior art system of FIG. 1a. Note that each worker node has its own associated virtual machine, and, an extensive amount of concurrent application threads are being executed per virtual machine. Specifically, there are X concurrent application threads ($112_1$ through $112_X$) running on virtual machine 113; there are Y concurrent application threads ($212_1$ through $212_Y$) running on virtual machine 213; . . . and, there are Z concurrent application threads ($N12_1$ through $N12_Z$) running on virtual machine N13; where, each of X, Y and Z is a large number.

A virtual machine, as is well understood in the art, is an abstract machine that converts (or "interprets") abstract code into code that is understandable to a particular type of a hardware platform (e.g., a particular type of processor). Because virtual machines operate at the instruction level they tend to have processor-like characteristics, and, therefore, can be viewed as having their own associated memory. The memory used by a functioning virtual machine is typically modeled as being local (or "private") to the virtual machine. Hence, FIG. 1b shows local memory 115, 215, . . . N15 allocated for each of virtual machines 113, 213, . . . N13 respectively.

Various problems exist with respect to the prior art application server 100 of FIG. 1a. To first order, the establishment of connections between the connection manager and the J2EE dispatcher to process a client session adds overhead/inefficiency within the standards based software suite 104. Moreover, the "crash" of a virtual machine is not an uncommon event. In the prior art standards suite 104 of FIG. 1a, requests that are submitted to a worker node for processing are entered into a queue built into the local memory of the virtual machine that is associated with the worker node. If the virtual machine crashes, its in-process as well as its locally queued requests will be lost. As such, potentially, if the requests for a significant number of sessions are queued into the local memory of a virtual machine (e.g., as a direct consequence of the virtual machine's concurrent execution of a significant number of threads), the crash of the virtual machine will cause a significant number of sessions to be "dropped" by the application server 100.

Distributed Computing Sessions Vs. Non-Distributed Computing Sessions

FIGS. 1c through 1d relate to differences between different types of sessions. As discussed previously, a session can be viewed as a back and forth communication over a network between a pair of computing systems. In the case of object oriented programming, however, there exist different types of sessions in which different kinds of request/response information are passed over the network.

FIG. 1c relates to a "non-distributed computing" session in which software running on a first computing system (such as client application 153c running on client computing system 151c) is essentially viewed as a separate software program than the software running on a second computing that it is engaged in a session with (such as server application 154c running on server computing system 152c), even if the pair of software programs are regarded as being part of the same overarching "application" software product.

That the pair of software programs 151c, 154c are regarded as being separate programs derives from the manner in which they interact with one another. Specifically, the client application 153c sends formal commands to the server application 154c that the server application 154c as a whole has made available (e.g., through its API 155) for "other" software programs to call upon should they desire to use the server application 154c.

Better said, the server application 154c has been designed to offer a formal set of externally available commands that other programs may use to invoke the use of the server application 154c, and, the client application 153c uses these formal set of commands over the course of its session with the server application. The most common types of sessions that adhere to this kind of session structure are HTTP and HTTPs sessions.

Certain software technologies, including Java, are "object oriented." According to an object oriented approach, the subject matter that is processed by a computer program is organized into classes of likeness. For example, the software used to sell items to customer X might belong to the same class of software (e.g., a class named "sales") that is used to sell items to customer Y.

Here, given that a significant degree of overlap is expected to exist regarding the methods and data types used to process sales for both customers X and Y (e.g., an "update billing about sale" method, an "update accounting about sale" method, a "part number" data type, a "quantity" data type . . . etc.) it is deemed more efficient to organize such methods and data types into a generic "sales" class from which specific instances of the class (e.g., an instance for selling to customer X and an instance for selling to customer Y) can be defined and created.

Each specific instance of a class is referred to as an object; and, each object assumes the characteristics of the class from which it is defined. Thus, a first object could be created from the generic sales class to create a "sell to customer X" object; and, a second object could be created from the generic sales class to create a "sell to customer Y" object. Both objects would be able to execute the methods defined by the class. For example, the "sell to customer X" object could execute the "update accounting about sale" method to update an accounting department about a sale to customer X; and, the "sell to customer Y" object could also execute the "update accounting about sale" method to update an accounting department about a sale to customer Y.

In general, the runtime execution of any computer program can be viewed as the execution of a sequence of methods. With respect to an object-oriented approach, such a sequence of methods can be implemented by calling upon a sequence of objects and invoking one or more methods at each object.

FIG. 1c shows both the client application 151c and the server application 154c as being object oriented, and, shows exemplary process flows occurring within each. Specifically, within the client application 153c, object 160 is observed calling upon (e.g., invoking a method of) 161 object 162 which provides a return value 163 to object 160. Object 160 then calls upon 164 object 165 which calls upon object 166, etc. Similarly, at the server application 154c, object 167 is observed calling upon 168.

In the regular flow of an object-oriented program at runtime, a first object's ability to successfully call upon a method of a second object involves knowing the identity and methods of the second object. Because the client application 153c is separate from the server application 154c, the operational flow within the client application 153c generally does not comprehend this level of detail concerning the objects within the server application 154c. As such, client application 153c objects do not directly call server application 154c objects as they do with one another.

Rather, as discussed above, the client side 151c sends a formal command (often packaged into a "request" packet that is sent over a network 150c) to the server application 154, and, the server application 154c responds 157 with a formal response to the request. Thus, in this sense, it can fairly be said that the client application's 153c object-to-object flows and the server application's 154c object-to-object flows are isolated from one another.

By contrast, FIGS. 1d and 1e relate to a "distributed computing" session in which the object-to-object flows occurring on different computing systems 151d, 152d are fairly viewed as being integrated with one another rather than being isolated from one another. As such, the client side 158a application software and the server side application software 158b are better viewed as being different parts of the same application software program—rather than different software programs altogether.

As such, as observed in FIG. 1d, an object 169 on the client side 151d is observed calling upon an object 170 on the server side 152d. In this case, the identity of a specific object method (as opposed to, for instance, an API command) is typically part of a "request" that flows over a network 150d separating the client 151d and server 152d.

FIG. 1e shows an exemplary functional model for implementing an object method call across a network 150e from a calling object 169 on a first computing system 151e to a "remote" object 170 on second computing system 152e. According to the functional model of FIG. 1e, a stub 174 is instantiated on the same machine that the calling object 169 is instantiated on.

The stub 174 acts as a sort of "proxy" for the remote object 170 so that it "appears" to the calling object 169 as if the remote object 170 were on the same machine as the calling object 169 (rather than a different one). That is, ideally, the stub 174 behaves, from the perspective of the calling object 169, as the remote object behaves 170. In implementation, the stub 174 may be little more than an interface that accepts method calls in the format that the remote object 170 would accept them if it were local to the calling object 170; and, provides return values in the same format that the remote object 170 would provide them if it were local to the remote object 170.

At least in cases where a remote object method call is actually made, the stub 174 does not contain the coding to perform the method that the calling object 169 has called. As such, a request that identifies the called method is packaged (e.g., by a client side object request brokering function 175) and sent 177 (in the form of a "request") over a network 150e to a server side object request brokering function 176. According to one perspective, the server side object request broker function 176 is generally deemed responsible for: 1) processing the request that was sent 177 over the network 150e; 2) locating the remote object 170 that will execute the remote method call; and, 3) passing the method call to the remote object's skeleton 177.

The remote object's skeleton 177, analogously with the function of the stub 174, "behaves" from the perspective of the remote object 170 as a calling object that is local to the remote object 170 should behave. As such, the skeleton 177 provides method calls to the remote object 170 in a format that a calling object local to the remote object 170 would provide them; and, accepts return values from the remote object 170 in the same format that a calling object local to the remote object 170 would accept them.

When the remote object 170 receives the method call it executes the called method and responds with a return value that is received by the skeleton 177. The return value is then embedded in a "response" which is passed over the network 150e (e.g., via an exchange 178 between client-side and server-side object request broker functions 175, 176), forwarded to the stub 174 and then to the calling object 169.

Various types of technologies for invoking remote method calls exist that have, at least to some degree, features of the functional model discussed just above. Some of these include, for instance, Common Object Request Broker Architecture (CORBA), Internet-Inter ORB Protocol (IIOP), Remote Method Invocation (RMI), and RMI-P4 (which is SAP corporation's version of RMI that approximately follows the model presented in FIG. 1e with the added role of a "dispatcher" that resides between the server side object request broker 176 and the invoked skeleton 177) and RMI/IIOP.

Another type of remote calling approach, referred to as "dynamic invocation", does not use a stub and instead incorporates a specific interface to the object request brokering function that the calling object 169 must comply with.

SUMMARY

A method is described that involves establishing a connection over a shared memory between a connection manager and a worker node. The shared memory is accessible to multiple worker nodes. Then sending, from the connection manager to the worker node over the connection, a first request containing a method call to a remote object on the worker node. Also sending, from the connection manager to the worker node over the connection, a second request containing a second method call to a second remote object on the worker node.

FIGURES

The present invention is illustrated by way of example and not limitation in the figures of the accompanying drawings, in which like references indicate similar elements and in which:

FIG. 1b shows a more detailed depiction of the J2EE worker nodes of FIG. 1a;

FIG. 6 shows a cluster whose servers include an integrated connection manager capable of supporting both distributed computing sessions and non distributed computing sessions that their corresponding servers are engaged in;

DETAILED DESCRIPTION 1.0 Overview

Figure 2:
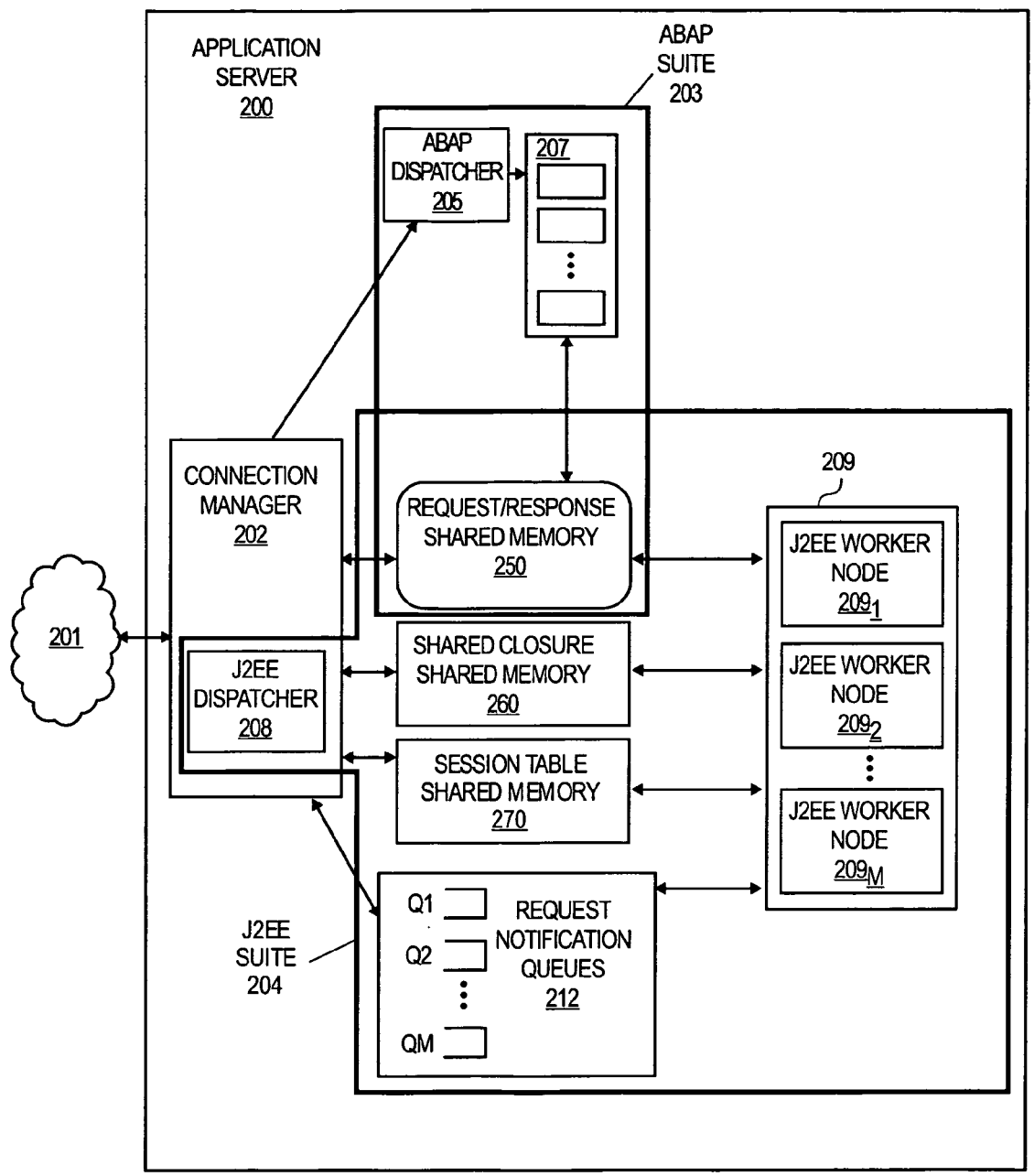
FIG. 2 shows an improved application server.

FIG. 2 shows the architecture of an improved application server that addresses the issues outlined in the Background section.

Figure 1A:
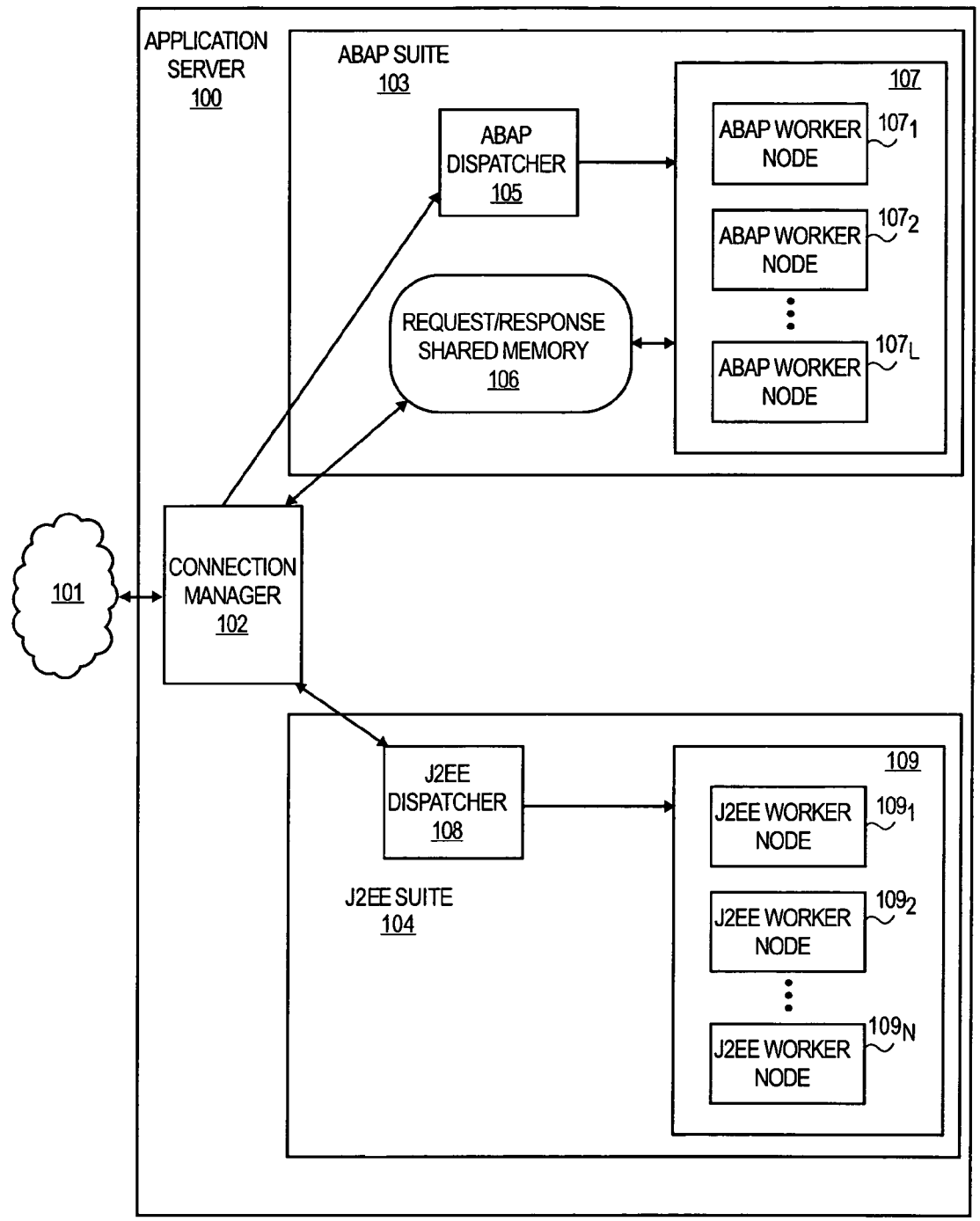
FIG. 1a shows a prior art application server.

Comparing FIGS. 1a and 2, firstly, note that the role of the connection manager 202 has been enhanced to perform dispatching 208 for the standards based software suite 204 (so as to remove the additional connection overhead associated with the prior art system's standard suite dispatching procedures).

Secondly, the role of a shared memory has been expanded to at least include: a) a first shared memory region 250 that supports request/response data transfers not only for the proprietary suite 203 but also the standards based software suite 204; b) a second shared memory region 260 that stores session objects having "low level" session state information (i.e., information that pertains to a request's substantive response such as the identity of a specific servlet invoked through a particular web page); and, c) a third shared memory region 270 that stores "high level" session state information (i.e., information that pertains to the flow management of a request/response pair within the application server (e.g., the number of outstanding active requests for a session)). In an implementation, as described in more detail below, shared memory region 260 is a "shared closure" shared memory region that is used not only to store objects is shared closure form having "low level" session state information, but also, objects in shared closure form that implement J2EE application software generally. As such, memory region 260 is much larger than memory region 270.

Third, request notification queues 212 Q1 through QM, one queue for each of the worker nodes $209_1$ through $209_M$ has been implemented within the standards-based software suite 204. As will be described in more detail below, the shared memory structures 250, 260, 270 and request notification queues 212 help implement a fast session fail over protection mechanism in which a session that is assigned to a first worker node can be readily transferred to a second worker node upon the failure of the first worker node.

Shared memory is memory whose stored content can be reached by multiple worker nodes. Here, the contents of each of the shared memory regions 250, 260 and 270 can be reached by each of worker nodes $209_1$ through $209_M$. Different types of shared memory technologies may be utilized within the application server 200 and yet still be deemed as being a shared memory structure. For example, shared memory region 250 may be implemented within a "connection" oriented shared memory technology, while shared memory region 260 may be implemented with a "shared closure" oriented shared memory technology. A more thorough discussion of these two different types of shared memory implementations is provided in more detail below in section 3.0 entitled "Implementation Embodiment of Request/Response Shared Memory" and section 4.0 entitled "Implementation Embodiment of Shared Closure Based Shared Memory".

The connection oriented request/response shared memory region 250 effectively implements a transport mechanism for request/response data between the connection manager and the worker nodes. That is, because the connection manager is communicatively coupled to the shared memory, and because shared memory contents can be made accessible to each worker node, the request/response shared memory 250—at perhaps its broadest level of abstraction—is a mechanism for transporting request/response data between the connection manager and the applicable worker node(s) for normal operation sessions (i.e., no worker node failure) as well as those sessions affected by a worker node crash.

Although the enhancements of the application server 200 of FIG. 2 have been directed to improving the reliability of a combined ABAP/J2EE application server, it is believed that architectural features and methodologies described in more detail further below can be more generally applied to various forms of computing systems that manage communicative sessions, whether or not such computing systems contain different types of application software suites, and whether any such application software suites are standards-based or proprietary. Moreover, it is believed that such architectural features and methodologies are generally applicable irrespective of any particular type of shared memory technology employed.

In operation, the connection manager 202 forwards actual request data to the first shared memory region 250 (request/response shared memory 250) irregardless of whether the request is to be processed by one of the proprietary worker nodes 207 or one of the standards based worker nodes 204. Likewise, the connection manager 202 receives response data for a request from the request/response shared memory 250 irregardless if the response was generated by a proprietary worker node or a standards based worker node. With the exception of having to share the request/response shared memory 250 with the worker nodes 209 of the standards-based software suite 204, the operation of the proprietary suite 203 is essentially the same as that described in the background.

That is, the connection manager 202 forwards request notifications to the proprietary dispatcher 205 and forwards the actual requests to the request/response shared memory 250. The proprietary dispatcher 205 then identifies which one of the proprietary worker nodes 207 is to handle the request. The identified worker node subsequently retrieves the request from the request/response shared memory 250, processes the request and writes the response into the request/response shared memory 250. The response is then forwarded from the request/response shared memory 250 to the connection manager 202 who forwards the response to the client via network 201.

2.0 Processing of a Single Request

Figure 3A:
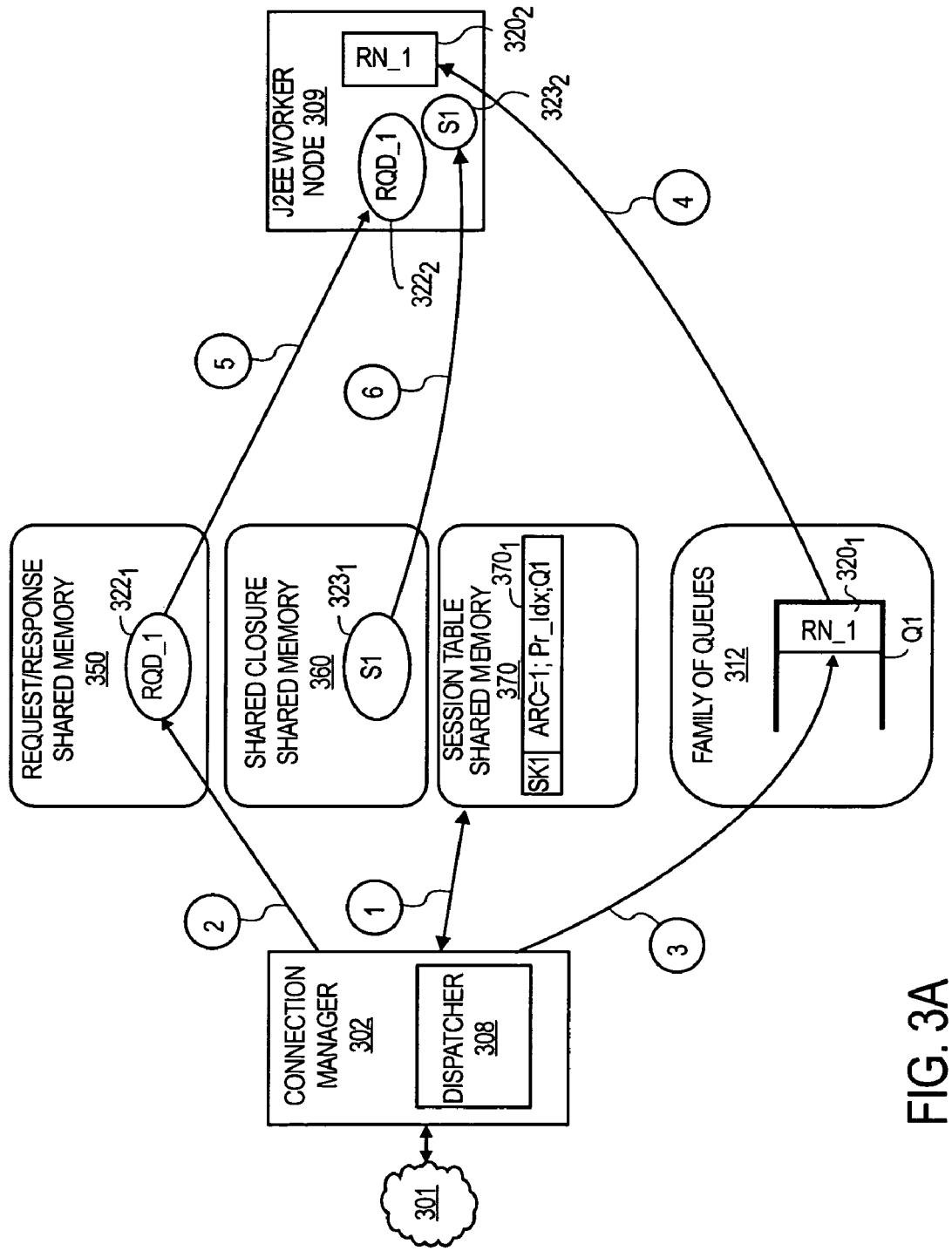
FIGS. 3a and 3b show a session request and response methodology that can be performed by the improved system of FIG. 2.
Figure 3B:
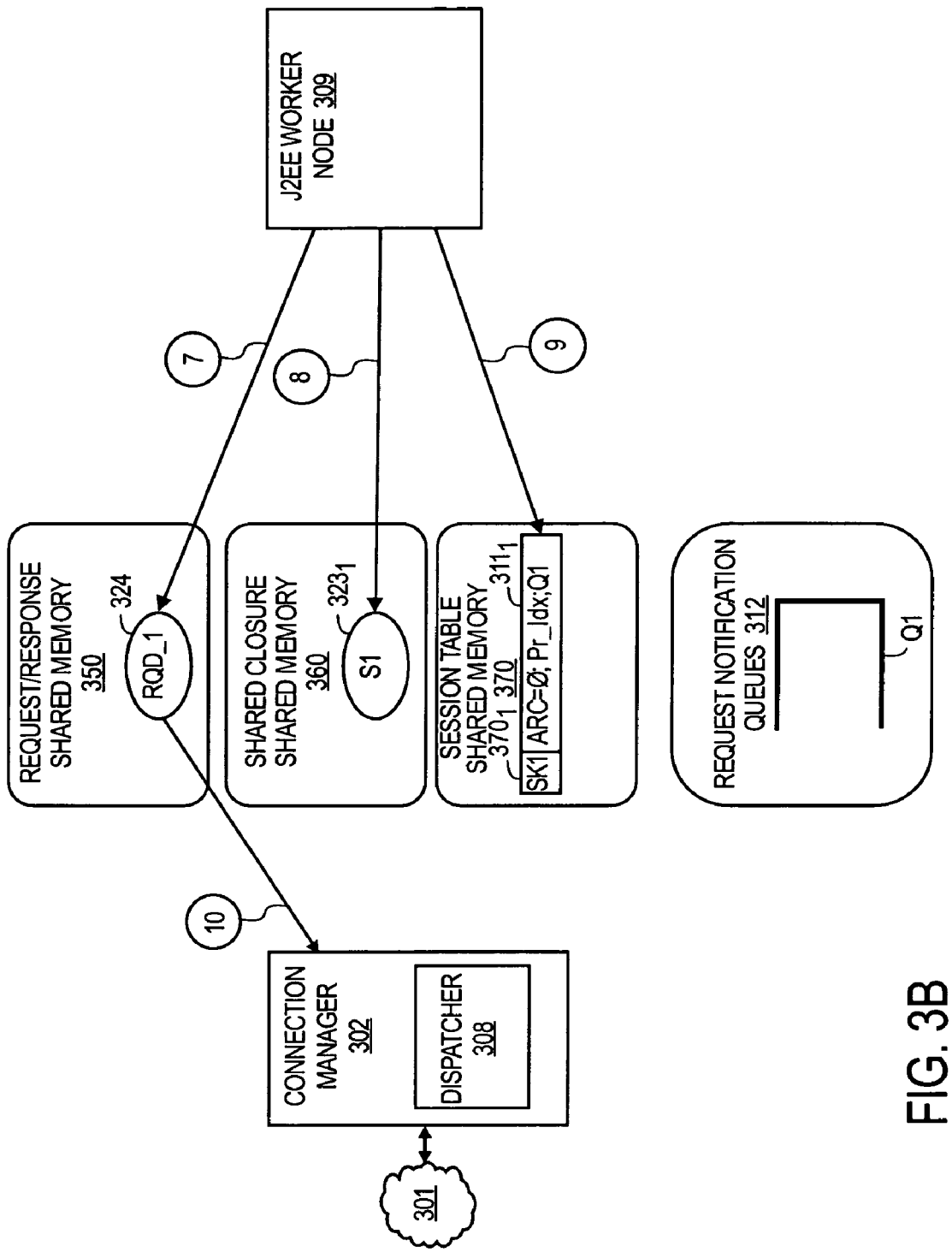

FIGS. 3a and 3b show an improved session handling flow that is used within the standards based software suite 204 of the improved application server 200 of FIG. 2. According to this flow, after the connection manager 302 receives a request from network 301 and determines that the request should be handled by the standards-based software suite, the session to which the request belongs is identified (or the request is identified as being the first request of a new session). Here, the connection manager 102 determines the existing session to which the request belongs or that the request is from a new session through well understood techniques (e.g., through a session identifier found in the header of the received request or a URL path found in the header of the received request).

Then, the dispatcher 308 for the standards-based software suite is invoked. For purposes of the present discussion it is sufficient to realize that the dispatcher 308: 1) accesses and updates at 1 "high level" state information $370_1$ for the request's session in the shared memory session table 370 (hereinafter, referred to as session table 370); 2) determines which one 309 of the M worker nodes should handle the newly arrived request; and 3) submits at 2 the request $322_1$ into the request/response shared memory 350 and submits at 3 a request notification $320_1$ for the request $322_1$ into a request notification queue Q1 that is associated with the worker node 309 identified by the dispatching algorithm. For ease of drawing, FIGS. 3a and 3b only depict the worker node 309 that has been identified by the dispatcher 308.

In an embodiment, there is an entry in the session table 370 for each session being supported by the M worker nodes. If the received request is for a new session (i.e., the received request is the first request of the session), the dispatcher process 308 will create at 1 a new entry $370_1$ in the session table 370 for the new session and assign at 2 one of the M worker nodes to handle the session based on a load balancing algorithm. By contrast, if the received request pertains to an already existing session, the dispatcher process 308 will access at 1 the already existing entry $370_1$ for the session and use the information therein to effectively determine the proper worker node to handle the request as well as update at 1 the session table entry $370_1$. In an embodiment, in the case of an already existing session, the determination of the proper worker node may or may not involve the execution of a load balancing algorithm.

In an embodiment, the following items are associated with each session table entry $370_1$: 1) a "key" used to access the session table entry $370_1$ itself (e.g., session key "SK1"); 2) an active request count (ARC) that identifies the total number of requests for the session that have been received from network 301 but for which a response has not yet been generated by a worker node; 3) an identifier of the worker node 309 that is currently assigned to handle the session's requests (e.g., "Pr_Idx", which, in an embodiment, is the index in the process table of the worker node that is currently assigned to handle the session's requests); and, 4) some form of identification of the request notification queue (Q1) that provides request notifications to the worker node 309 identified in 3) above.

In a further embodiment, each entry in the session table 370 further includes: 1) a flag that identifies the session's type (e.g., in an implementation, the flag can indicate a "distributed" session (which is a session that permits the handling of its requests by different worker nodes over the course of its regular operation), a "sticky" session (which is a session whose requests are handled by only one worker node over the normal course of its operation), or a "corrupted" session (which is a session that has suffered some kind of problem that cannot be corrected); 2) a timeout value that indicates the maximum amount of time a request can remain outstanding, that is, waiting for a response; 3) the total number of requests that have been received for the session; 4) the time at which the session entry was created; and, 5) the time at which the session entry was last used.

For each request, whether a first request of a new session or a later request for an already established session, the dispatcher's dispatching algorithm 308 increments the ARC value and at 8 places a "request notification" RN_1 $320_1$, into the request notification queue Q1 that feeds request notifications to the worker node 309 that is to handle the session. The request notification RN_1 contains both a pointer to the request data RQD_1 $322_1$ in the request/response shared memory and the session key SK1 in the session table entry for the session.

The pointer is generated by that portion of the connection manager 302 that stores the request data RQD_1 $322_1$ into the request/response shared memory 350 and is provided to the dispatcher 308. The pointer is used by the worker node 309 to fetch the request data RQD_1 $322_1$ from the request/response shared memory 350, and, therefore, the term "pointer" should be understood to mean any data structure that can be used to locate and fetch the request data. The session key (or some other data structure in the request notification RN_1 that can be used to access the session table entry $370_1$ for the session) is used by the worker node 309 to decrement the ARC counter to indicate the worker node 309 has fully responded to the request.

As will be described in more detail below in section 3.0 entitled "Implementation Embodiment of Request/Response Shared Memory", according to a particular implementation, the request/response shared memory 350 is connection based. Here, a connection is established between the targeted (assigned) worker node 309 and the connection manager 302 through the request/response shared memory 350 for each request/response cycle that is executed in furtherance of a particular session; and, a handle for a particular connection is used to retrieve a particular request from the request/response shared memory 350 for a particular request/response cycle. According to this implementation, the pointer in the request notification RN is the "handle" for the shared memory 350 connection that is used to fetch request data RQD_1 $322_1$.

In the case of a first request for a new session, the dispatcher 308 determines which worker node should be assigned to handle the session (e.g., with the assistance of a load balancing algorithm) and places the identity of the worker node's request notification queue (Q1) into a newly created session table entry $370_1$ for the session along with some form of identification of the worker node itself (e.g., "Pr_Idx", the index in the process table of the worker node that is currently assigned to handle the session's requests). For already existing sessions, the dispatcher 308 simply refers to the identify of the request notification queue (Q1) in the session's session table entry $370_1$ in order to understand which request notification queue the request notification RN should be entered into.

In a further embodiment, a single session can entertain multiple "client connections" over its lifespan, where, each client connection corresponds to a discrete time/action period over which the client engages with the server. Different client connections can therefore be setup and torn down between the client and the server over the course of engagement of an entire session. Here, depending on the type of client session, for example in the case of a "distributed" session (described in more detail further below), the dispatcher 308 may decide that a change should be made with respect to the worker node that is assigned to handle the session. If such a change is to be made the dispatcher 308 performs the following within the entry $370_1$ for the session: 1) replaces the identity of the "old" worker node with the identity of the "new" worker node (e.g., a "new" Pr_Idx value will replace an "old" Pr_Idx value); and, 2) replaces the identification of the request notification queue for the "old" worker node with an identification of the request notification queue for the "new" worker node.

In another embodiment, over the course a single session and perhaps during the existence of a single client connection, the client may engage with different worker node applications. Here, a different entry in the session table can be entered for each application that is invoked during the session. As such, the level of granularity of a session's management is drilled further down to each application rather than just the session as a whole. A "session key" (SK1) is therefore generated for each application that is invoked during the session. In an embodiment, the session key has two parts: a first part that identifies the session and a second part that identifies the application (e.g., numerically through a hashing function).

Continuing then with a description of the present example, with the appropriate worker node 309 being identified by the dispatcher 308, the dispatcher 308 concludes with the submission at 2 of the request RQD_1 $322_1$ into the request/response shared memory 350 and the entry at 3 of a request notification RN_1 $320_1$ into the queue Q1 that has been established to supply request notifications to worker node 309. The request notification RN_1 $320_1$ sits in its request notification queue Q1 until the targeted worker node 309 foresees an ability (or has the ability) to process the corresponding request $322_1$. Recall that the request notification RN_1 $320_1$ includes a pointer to the request data itself RQD_1 $322_1$ as well as a data structure that can be used to access the entry $370_1$ in the session table (e.g., the session key SK1).

Comparing FIGS. 2 and 3a, note that with respect to FIG. 2 a separate request notification queue is implemented for each worker node (that is, there are M queues, Q1 through QM, for the M worker nodes $209_1$ through $209_M$, respectively). Having a request notification queue for each worker node allows for the "rescue" of a session whose request notification(s) have been entered into the request notification queue of a particular worker node that fails ("crashes") before the request notification(s) could be serviced from the request notification queue.

When the targeted worker node 309 foresees an ability to process the request $322_1$, it looks to its request notification queue Q1 and retrieves at 4 the request notification RN_1 $320_1$ from the request notification queue Q1. FIG. 3a shows the targeted worker node 309 as having the request notification RN_1 $320_2$ to reflect the state of the worker node after this retrieval at 4. Recalling that the request notification RN_1 $320_1$ includes a pointer to the actual request RQD_1 $322_1$ within the request/response shared memory 350, the targeted worker node 309 subsequently retrieves at 5 the appropriate request RQD_1 $322_1$ from the request/response shared memory 350. FIG. 3a shows the targeted worker node 309 as having the request RQD_1 $322_2$ to reflect the state of the worker node after this retrieval at 5. In an embodiment where the request/response shared memory is connection oriented, the pointer to RQD_1 $322_1$ is a "handle" that the worker node 309 uses to establish a connection with the connection manager 302 and then read at 5 the request RQD_1 $322_1$ from the request/response shared memory.

The targeted worker node 309 also assumes control of one or more "session" objects S1 $323_2$ used to persist "low level" session data. Low level session data pertains to the request's substantive response rather than its routing through the application server. If the request is the first request for a new session, the targeted worker node 309 creates the session object(s) S1 $323_2$ for the session; or, if the request is a later request of an existing session, the targeted worker node 309 retrieves 6 previously stored session object(s) S1 $323_1$ from the "shared closure" memory region 360 into the targeted worker node $323_2$. The session object(s) S1 may $323_1$ be implemented as a number of objects that correspond to a "shared closure". A discussion of shared closures and an implementation of a shared closure memory region 360 is provided in more detail further below in section 4.0 entitled "Implementation Embodiment of Shared Closure Based Shared Memory".

With respect to the handling of a new session, the targeted worker node 309 generates a unique identifier for the session object(s) S1 323 according to some scheme. In an embodiment, the scheme involves a random component and an identifier of the targeted worker node itself 309. Moreover, information sufficient to identify a session uniquely (e.g., a sessionid parameter from a cookie that is stored in the client's browser or the URL path of the request) is found in the header of the request RQD_1 $322_2$ whether the request is the first request of a new session or a later requests of an existing session. This information can then be used to fetch the proper session object(s) S1 323 for the session.

FIG. 3b depicts the remainder of the session handling process. With the targeted worker node 309 having the request RQD_1 $322_2$ and low level session state information via session object(s) S1 $323_2$, the request is processed by the targeted worker node 309 resulting in the production of a response 324 that is to be sent back to the client. The worker node 309 writes at 7 the response 324 into the response/request shared memory 350; and, if a change to the low level session state information was made over the course of generating the response, the worker node 309 writes at 8 updated session object(s) into the shared closure memory 360. Lastly, the worker node 309 decrements at 9 the ARC value in the session table entry $370_1$ to reflect the fact that the response process has been fully executed from the worker node's perspective and that the request has been satisfied. Here, recall that a segment of the request notification RN_1 $320_2$ (e.g., the session key SK1) can be used to find a "match" to the correct entry $370_1$ in the session table 370 in order to decrement of the ARC value for the session.

In reviewing the ARC value across FIGS. 3a and 3b, note that it represents how many requests for the session have been received from network 301 by the connection manager 302 but for which no response has yet been generated by a worker node. In the case of FIGS. 3a and 3b only one request is at issue, hence, the ARC value never exceeds a value of 1. Conceivably, multiple requests for the same session could be received from network 301 prior to any responses being generated. In such a case the ARC value will reach a number greater than one that is equal to the number of requests that are queued or are currently being processed by a worker node but for which no response has been generated.

After the response 324 is written at 7 into the request/response shared memory 350, it is retrieved at 10 into the connection manager 302 which then sends it to the client over network 301.

3.0 Implementation Embodiment of Request/Response Shared Memory

Recall from above that according to a particular implementation, the request/response shared memory 250 has a connection oriented architecture. Here, a connection is established between the targeted worker node and the connection manager across the request/response shared memory 350 for each request/response cycle between the connection manager and a worker node. Moreover, a handle to a particular connection is used to retrieve a particular request from the request/response shared memory.

The connection oriented architecture allows for easy session handling transfer from a crashed worker node to a new worker node because the routing of requests to a new targeted worker node is accomplished merely by routing the handle for a specific request/response shared memory connection to the new worker node. That is, by routing the handle for a request/response shared memory connection to a new worker node, the new worker node can just as easily "connect" with the connection manager to obtain a request as the originally targeted (but now failed) worker node. Here, the "pointer" contained by the request notification is the handle for the request's connection.

Figure 4:
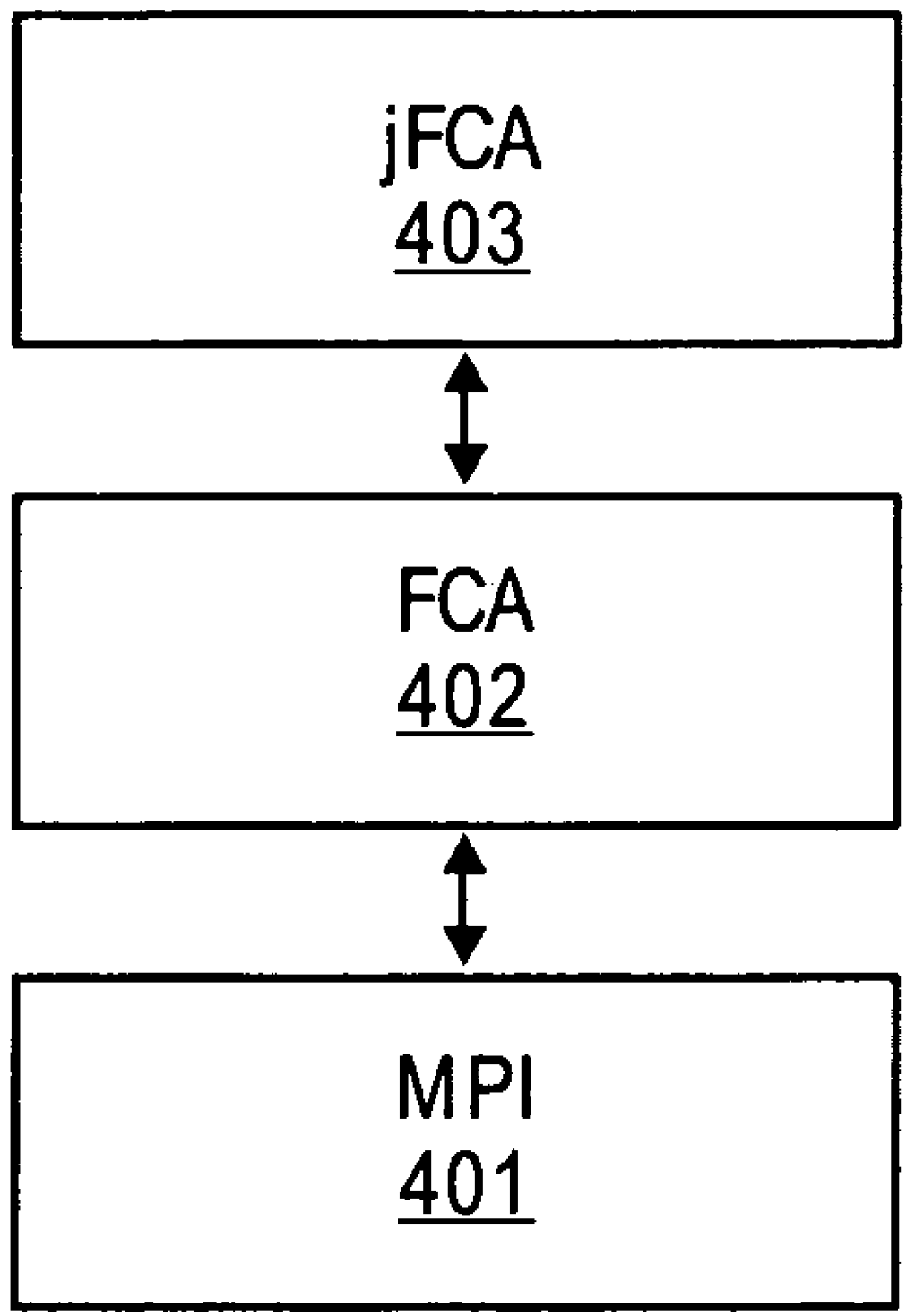
FIG. 4 shows different layers of a shared memory access technology.

FIG. 4 shows an embodiment of an architecture for implementing a connection based queuing architecture. According to the depiction in FIG. 4, the connection based queuing architecture is implemented at the Fast Channel Architecture (FCA) level 402. The FCA level 402 is built upon a Memory Pipes technology 401 which is a legacy "semaphore based" request/response shared memory technology 106 referred to in the Background. The FCA level 402 includes an API for establishing connections with the connection manager and transporting requests through them.

In a further embodiment, referring to FIGS. 2 and 4, the FCA level 402 is also used to implement each of the request notification queues 212. As such, the request notification queues 212 are also implemented as a shared memory technology. Notably, the handlers for the request notification queues 212 provide more permanent associations with their associated worker nodes. That is, as described, each of the request notification queues 212 is specifically associated with a particular worker node and is "on-going". By contrast, each request/response connection established across request/response shared memory 250 is made easily useable for any worker node (to support fail over to a new worker node), and, according to an implementation, exist only for each request/response cycle.

Above the FCA level 402 is the jFCA level 403. The jFCA level 403 is essentially an API used by the Java worker nodes and relevant Java parts of the connection manager to access the FCA level 402. In an embodiment, the jFCA level is modeled after standard Java Networks Socket technology. At the worker node side, however, a "jFCA connection" is created for each separate request/response cycle through request/response shared memory; and, a "jFCA queue" is created for each request notification queue. Thus, whereas a standard Java socket will attach to a specific "port" (e.g., a specific TCP/IP address), according to an implementation, the jFCA API will establish a "jFCA queue" that is configured to implement the request notification queue of the applicable worker node and a "jFCA connection" for each request/response cycle.

Here, an instance of the jFCA API includes the instance of one or more objects to: 1) establish a "jFCA queue" to handle the receipt of request notifications from the worker node's request notification queue; 2) for each request notification, establishing a "jFCA connection" over request/response shared memory with the connection manager so that the corresponding request from the request/response shared memory can be received (through the jFCA's "InputStream"); and, 3) for each received request, the writing of a response back to the same request/response shared memory connection established for the request (through the jFCA's "OutputStream").

In the outbound direction (i.e., from the worker node to the connection manager), in an embodiment, the same jFCA connection that is established through the request/response shared memory between the worker node and the connection manager for retrieving the request data is used to transport the response back to the connection manager.

In a further embodiment, a service (e.g., an HTTP service) is executed at each worker node that is responsible for managing the flow of requests/responses and the application(s) invoked by the requests sent to the worker node. In a further embodiment, in order to improve session handling capability, the service is provided its own "dedicated thread pool" that is separate from the thread pool that is shared by the worker node's other applications. By so-doing, a fixed percentage of the worker node's processing resources are allocated to the service regardless of the service's actual work load. This permits the service to immediately respond to incoming requests during moments of light actual service work load and guarantees a specific amount of performance under heavy actual service workload.

According to one implementation, each thread in the dedicated thread pool is capable of handling any request for any session. An "available" thread from the dedicated thread pool listens for a request notifications arriving over the jFCA queue. The thread services the request from the jFCA queue and establishes the corresponding jFCA connection with the handler associated with the request notification and reads the request from request/response shared memory. The thread then further handles the request by interacting with the session information associated with the request's corresponding session.

Each worker node may have its own associated container(s) in which the service runs. A container is used to confine/define the operating environment for the application thread(s) that are executed within the container. In the context of J2EE, containers also provide a family of services that applications executed within the container may use (e.g., (e.g., Java Naming and Directory Interface (JNDI), Java Database Connectivity (JDBC), Java Messaging Service (JMS) among others).

Different types of containers may exist. For example, a first type of container may contain instances of pages and servlets for executing a web based "presentation" for one or more applications. A second type of container may contain granules of functionality (generically referred to as "components" and, in the context of Java, referred to as "beans") that reference one another in sequence so that, when executed according to the sequence, a more comprehensive overall "business logic" application is realized (e.g., stringing revenue calculation, expense calculation and tax calculation components together to implement a profit calculation application).

4.0 Implementation Embodiment of Shared Closure Based Shared Memory

Figure 1B:
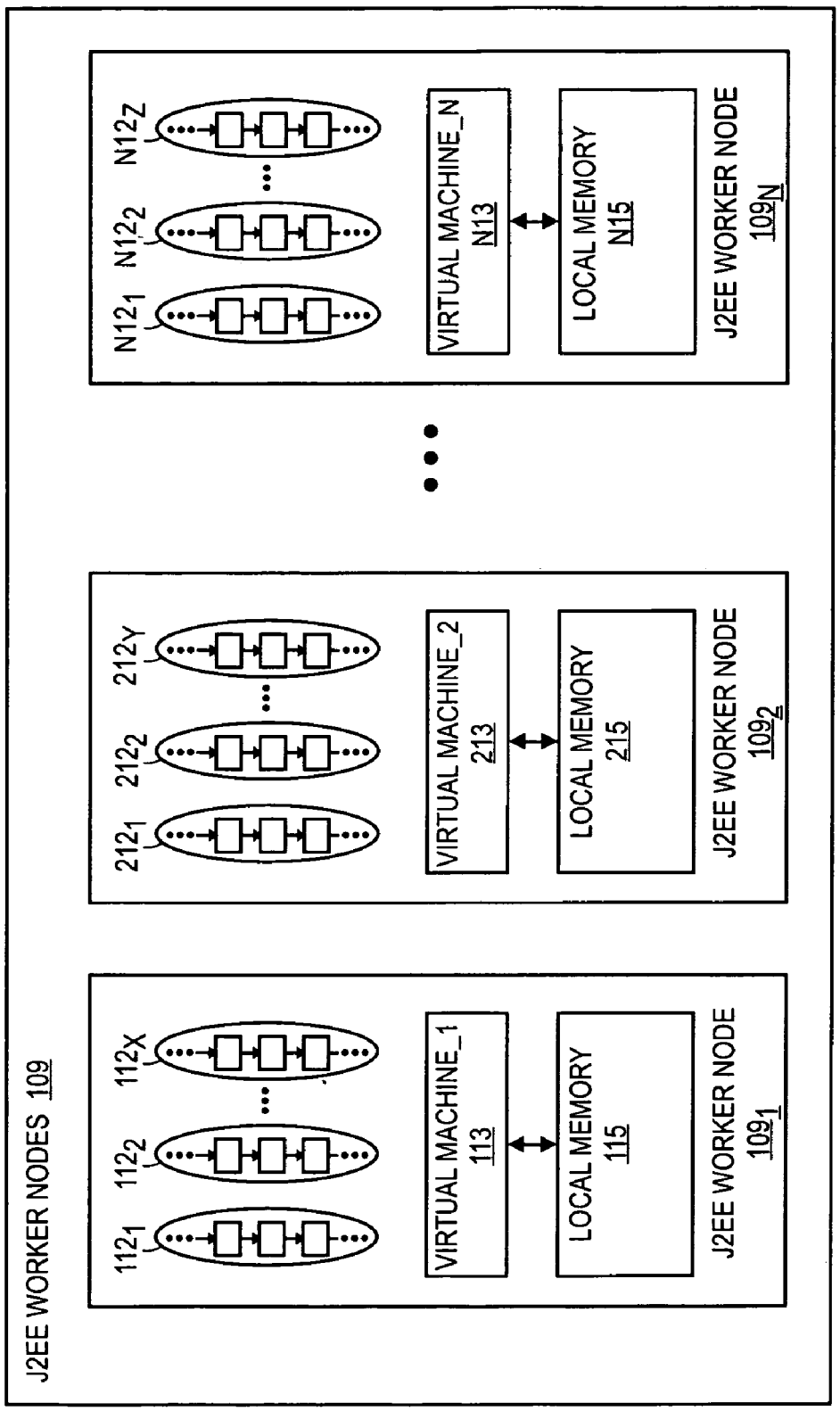
Figure 5:
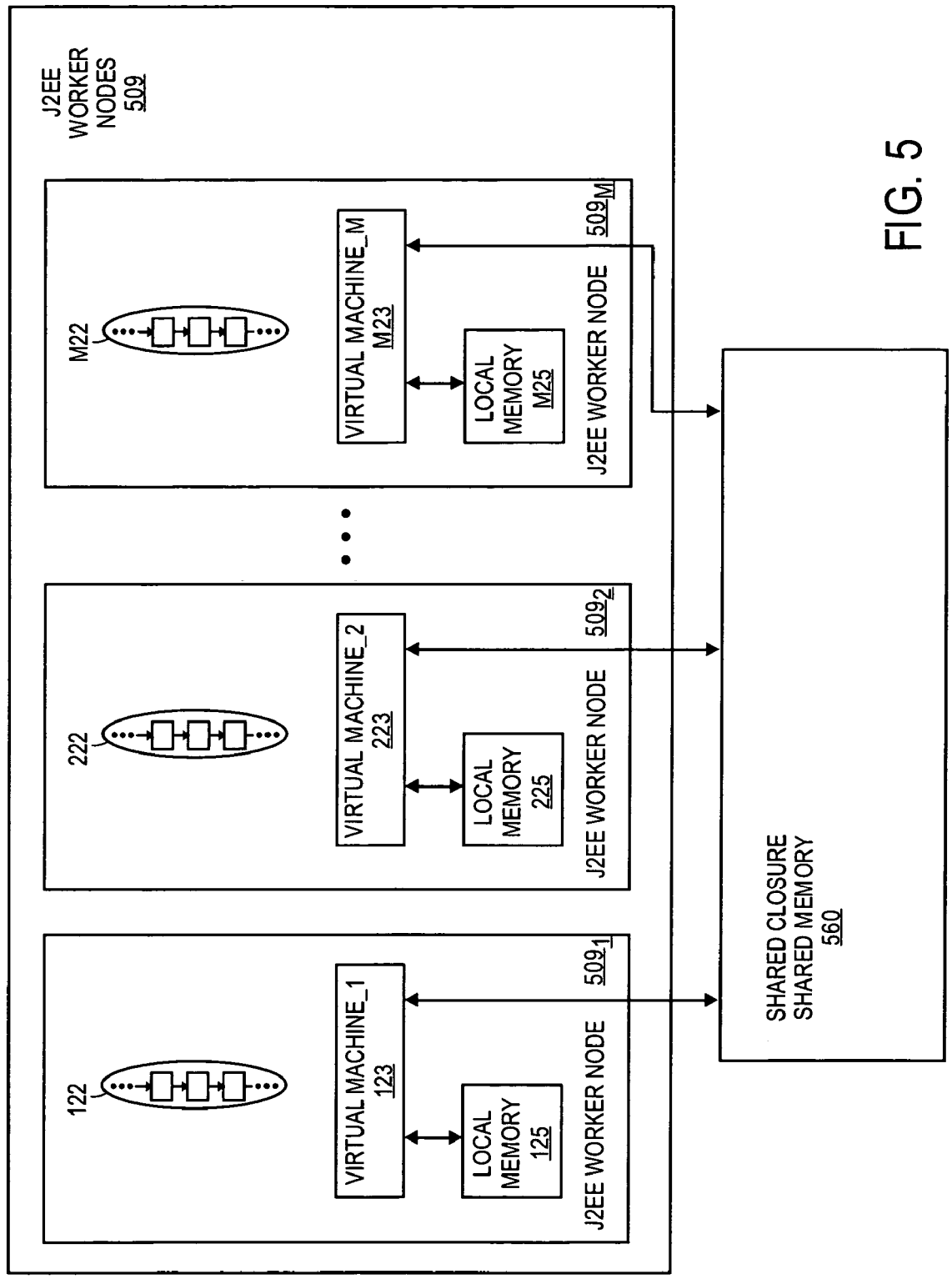
FIG. 5 shows a depiction of a shared closure based shared memory system.

Recall from the Background in the discussion pertaining to FIG. 1b that the worker nodes 109 depicted therein engage in an extensive number of application threads per virtual machine. FIG. 5 shows worker nodes 509 that can be viewed as a detailed depiction of an implementation for worker nodes 209 of FIG. 2; where, the worker nodes 209, 509 are configured with less application threads per virtual machine than the prior art approach of FIG. 1b. Less application threads per virtual machine results in less application thread crashes per virtual machine crash; which, in turn, should result in the new standards-based suite 204 of FIG. 2 exhibiting better reliability than the prior art standards-based suite 104 of FIG. 1a.

According to the depiction of FIG. 5, which is an extreme representation of the improved approach, only one application thread exists per virtual machine (specifically, thread 122 is being executed by virtual machine 123; thread 222 is being executed by virtual machine 223; . . . and, thread M22 is being executed by virtual machine M23). In practice, the worker nodes 509 of FIG. 5 may permit a limited number of threads to be concurrently processed by a single virtual machine rather than only one.

In order to concurrently execute a comparable number of application threads as the prior art worker nodes 109 of FIG. 1b, the improved worker nodes 509 of FIG. 5 instantiate more virtual machines than the prior art worker nodes 109 of FIG. 1b. That is, M>N.

Thus, for example, if the prior art worker nodes 109 of FIG. 1b have 10 application threads per virtual machine and 4 virtual machines (e.g., one virtual machine per CPU in a computing system having four CPUs) for a total of 4×10=40 concurrently executed application threads for the worker nodes 109 as a whole, the improved worker nodes 509 of FIG. 5 may only permit a maximum of 5 concurrent application threads per virtual machine and 6 virtual machines (e.g., 1.5 virtual machines per CPU in a four CPU system) to implement a comparable number (5×6=30) of concurrently executed threads as the prior art worker nodes 109 of FIG. 1b.

Here, the prior art worker nodes 109 instantiate one virtual machine per CPU while the improved worker nodes 509 of FIG. 5 can instantiate multiple virtual machines per CPU. For example, in order to achieve 1.5 virtual machines per CPU, a first CPU may be configured to run a single virtual machine while a second CPU in the same system may be configured to run a pair of virtual machines. By repeating this pattern for every pair of CPUs, such CPU pairs will instantiate 3 virtual machines per CPU pair (which corresponds to 1.5 virtual machines per CPU).

Recall from the discussion of FIG. 1b that a virtual machine can be associated with its own local memory. Because the improved worker nodes 509 of FIG. 5 instantiate more virtual machines than the prior art working nodes 109 of FIG. 1b, in order to conserve memory resources, the virtual machines 123, 223, . . . M23 of the worker nodes 509 of FIG. 5 are configured with less local memory space 125, 225, . . . M25 than the local memory space 115, 215, . . . N15 of virtual machines 113, 213, . . . N23 of FIG. 1*b*. Moreover, the virtual machines 123, 223, . . . M23 of the worker nodes 509 of FIG. 5 are configured to use a shared memory 560. Shared memory 560 is memory space that contains items that can be accessed by more than one virtual machine (and, typically, any virtual machine configured to execute "like" application threads that is coupled to the shared memory 560).

Thus, whereas the prior art worker nodes 109 of FIG. 1*b* use fewer virtual machines with larger local memory resources containing objects that are "private" to the virtual machine; the worker nodes 509 of FIG. 5, by contrast, use more virtual machines with less local memory resources. The less local memory resources allocated per virtual machine is compensated for by allowing each virtual machine to access additional memory resources. However, owing to limits in the amount of available memory space, this additional memory space 560 is made "shareable" amongst the virtual machines 123, 223, . . . M23.

According to an object oriented approach where each of virtual machines 123, 223, . . . M23 does not have visibility into the local memories of the other virtual machines, specific rules are applied that mandate whether or not information is permitted to be stored in shared memory 560. Specifically, to first order, according to an embodiment, an object residing in shared memory 560 should not contain a reference to an object located in a virtual machine's local memory because an object with a reference to an unreachable object is generally deemed "non useable".

That is, if an object in shared memory 560 were to have a reference into the local memory of a particular virtual machine, the object is essentially non useable to all other virtual machines; and, if shared memory 560 were to contain an object that was useable to only a single virtual machine, the purpose of the shared memory 560 would essentially be defeated.

In order to uphold the above rule, and in light of the fact that objects frequently contain references to other objects (e.g., to effect a large process by stringing together the processes of individual objects; and/or, to effect relational data structures), "shareable closures" are employed. A "closure" is a group of one or more objects where every reference stemming from an object in the group that references another object does not reference an object outside the group. That is, all the object-to-object references of the group can be viewed as closing upon and/or staying within the confines of the group itself. Note that a single object without any references stemming from can be viewed as meeting the definition of a closure.

If a closure with a non shareable object were to be stored in shared memory 560, the closure itself would not be shareable with other virtual machines, which, again, defeats the purpose of the shared memory 560. Thus, in an implementation, in order to keep only shareable objects in shared memory 560 and to prevent a reference from an object in shared memory 560 to an object in a local memory, only "shareable" (or "shared") closures are stored in shared memory 560. A "shared closure" is a closure in which each of the closure's objects are "shareable".

A shareable object is an object that can be used by other virtual machines that store and retrieve objects from the shared memory 560. As discussed above, in an embodiment, one aspect of a shareable object is that it does not possess a reference to another object that is located in a virtual machine's local memory. Other conditions that an object must meet in order to be deemed shareable may also be effected. For example, according to a particular Java embodiment, a shareable object must also posses the following characteristics: 1) it is an instance of a class that is serializable; 2) it is an instance of a class that does not execute any custom serializing or deserializing code; 3) it is an instance of a class whose base classes are all serializable; 4) it is an instance of a class whose member fields are all serializable; 5) it is an instance of a class that does not interfere with proper operation of a garbage collection algorithm; 6) it has no transient fields; and, 7) its finalize ( ) method is not overwritten.

Exceptions to the above criteria are possible if a copy operation used to copy a closure into shared memory 560 (or from shared memory 560 into a local memory) can be shown to be semantically equivalent to serialization and deserialization of the objects in the closure. Examples include instances of the Java 2 Platform, Standard Edition 1.3 java.lang.String class and java.util.Hashtable class.

A container is used to confine/define the operating environment for the application thread(s) that are executed within the container. In the context of J2EE, containers also provide a family of services that applications executed within the container may use (e.g., (e.g., Java Naming and Directory Interface (JNDI), Java Database Connectivity (JDBC), Java Messaging Service (JMS) among others).

Different types of containers may exist. For example, a first type of container may contain instances of pages and servlets for executing a web based "presentation" for one or more applications. A second type of container may contain granules of functionality (generically referred to as "components" and, in the context of Java, referred to as "beans") that reference one another in sequence so that, when executed according to the sequence, a more comprehensive overall "business logic" application is realized (e.g., stringing revenue calculation, expense calculation and tax calculation components together to implement a profit calculation application).

5.0 Connection Manager Capable of Supporting Both Distributed Computing Sessions and Non Distributed Computing Sessions Referring back to FIG. 2, recall from above that according to a particular implementation, the request/response shared memory 250 has a connection oriented architecture. Here, a connection is established between the targeted worker node and the connection manager across the request/response shared memory 250 for each request/response cycle between the connection manager and a worker node. That is, each request/response connection established across request/response shared memory 250 exists only for each request/response cycle.

By contrast, also as described above, recall that each of the request notification queues 212 is specifically associated with a particular worker node and is "on-going". That is, each queue is a more permanent connection that may exist, for instance, as long as both the connection manager 202 and its corresponding worker node are "up and running".

According to a further implementation, request/response data for "distributed computing" sessions (e.g., those implemented according to any one of the following protocols: CORBA, IIOP, RMI, RMI-P4, RMI/IIOP, etc.) are passed through more permanent connections established through the request/response shared memory 250—like those used to implement the request notification queues 212. As such, rather than setting up and tearing down a request/response shared memory 250 connection for each request/response cycle (as in the case of HTTP sessions as described above), distributing computing request/response data is sent through a quasi-permanent connection that has been established through the request/response shared memory 250 between the connection manager 202 and the affected worker node.

Figure 1C:
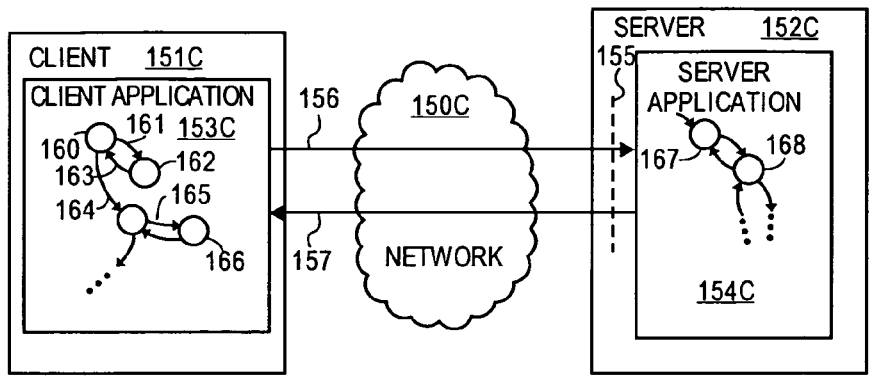
FIG. 1c shows a request/response cycle for a non distributed computing session.
Figure 1D:
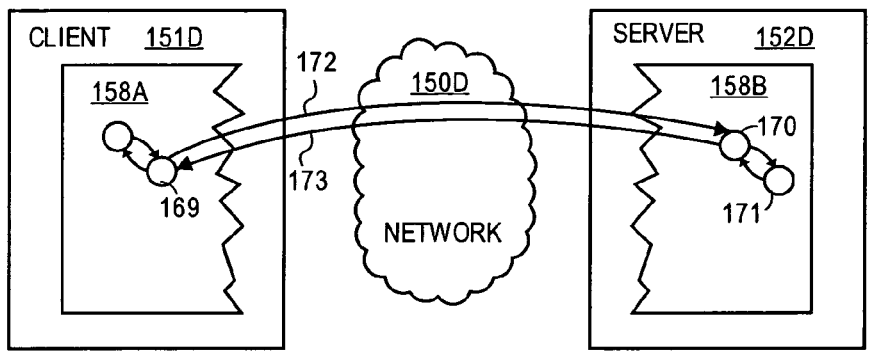
FIG. 1d shows a request/response cycle for a distributed computing session.
Figure 1E:
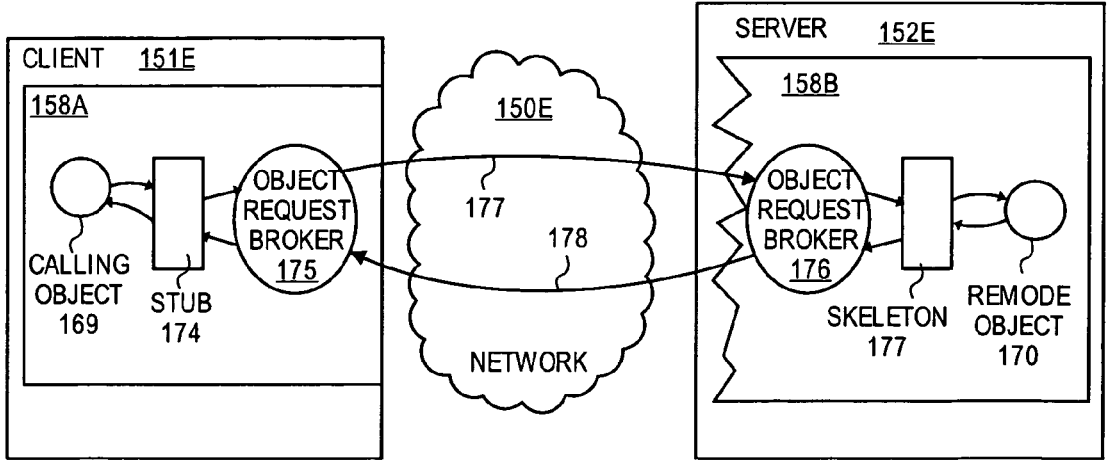
FIG. 1e shows a model for implementing a distributed computing session.

Thus (recalling the discussion provided in the background of FIGS. 1c through 1e concerning the distinction between sessions established between software programs that are fairly deemed separate from one another and "distributed computing" sessions between software running on different machines that are nevertheless fairly deemed as different parts of the same software program), request/response cycles that deal with "high level" (e.g., API) command invocations flow through shared memory 250 connections are setup and torn down on request/response cycle per request/response cycle basis, where, by contrast, request/response cycles that deal with "low level" remote object method calls flow through quasi-permanent shared memory 250 connections.

Figure 6:
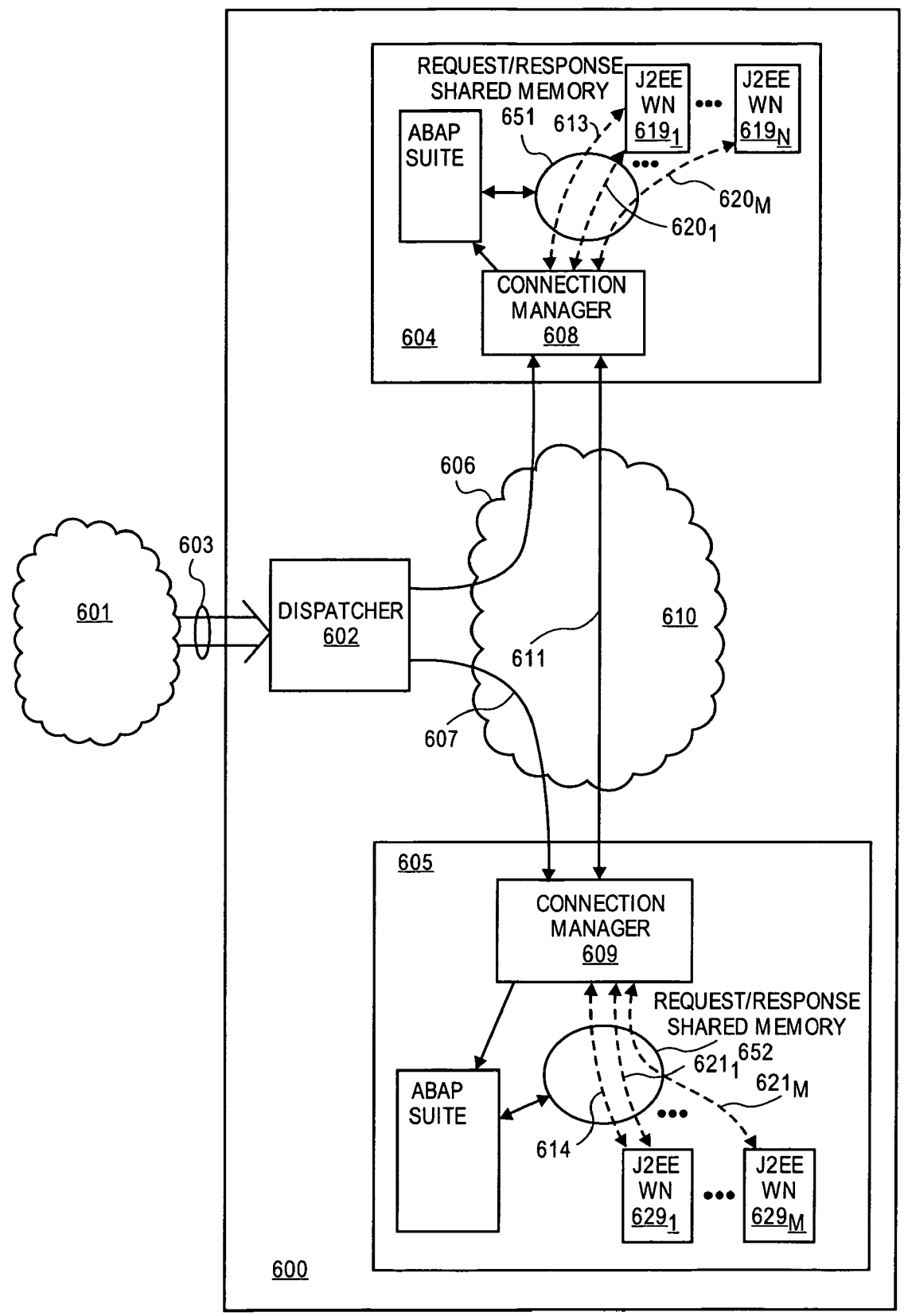

FIG. 6 shows a depiction of such an arrangement and will be used to explain some possible motivations for doing so. FIG. 6 shows a simple "cluster" of application servers 604, 605 that are communicatively coupled through a cluster network 610 that is local to the cluster. A cluster 600 is often viewed as a high capacity resource where multiple instances of similarly/identically configured servers (e.g., servers containing much of the same application software) are used to simultaneously support a potentially large number of external clients and their corresponding requests.

Here, the cluster 600 is communicatively coupled to the external clients (not shown in FIG. 6) through a larger network 601 (e.g., a large corporate intranet and/or the Internet, etc.). A dispatcher 602 distributes (potentially large numbers of) incoming requests 603 from the network 601 across the servers 604, 605 within the cluster. Here, flows 606, 607 are meant to depict the various incoming request flows from network 601 that are distributed by the dispatcher 602 to application server 604 and 605, respectively.

There may also exist request/response cycles between application servers 604 and 605 as well. In these instances, which server is the "client" and which server is the "server" depends on which server issues the request and which server issues the response. Specifically, for any request/response cycle between a pair of computing systems that are both primarily used as servers (such as a pair of application servers) the server that sends the request is deemed "the client" and the server that sends the response to the request is deemed "the server". Flow 611 is meant to depict request/response cycles between servers 604 and 605.

Referring to FIG. 6, connection 613 in application server 604 is meant to depict a single "temporary" connection through request/response shared memory 651 that has been established for a single HTTP/response cycle between application software running on worker node $619_1$ and "separate" application software running on another computing system. Similarly, connection 614 in application server 605 is meant to depict a single "temporary" connection through request/response shared memory 652 that has been established for a single HTTP request/response cycle between application software running on worker node $629_1$ and "separate" application software running on another computing system.

By contrast, within application server 604, connections $620_1$ through $620_M$ correspond to quasi-permanent connections that have been established between connection manager 608 and worker nodes $619_1$ through $619_M$, respectively, for the handling of any "distributed computing" sessions that the application software running on worker nodes $619_1$ through $619_M$ engage in. For example, certain software applications running on worker node $619_1$ may engage in a plurality of different distributed computing sessions over time. The request/response data for each of these sessions will flow through connection $620_1$.

Similarly, within application server 605, connections $621_1$ through $621_M$ correspond to quasi-permanent connections that have been established between connection manager 609 and worker nodes $629_1$ through $629_M$, respectively, for the handling of any "distributed computing" sessions that the application software running on worker nodes $629_1$ through $629_M$ engage in.

A reason for implementing distributed computing sessions with quasi-permanent connections as described above (instead of "per request/response cycle" connections as in the case of HTTP sessions), is that, from the perspective of one of servers 604, 605, the server: 1) generates and receives session requests for distributed computing sessions (e.g., with the other one of the servers); while, 2) mostly receives session requests for non distributed computing sessions (e.g., HTTP sessions with clients coupled to network 601).

Because of the bi-directional nature of request/response flows within the server for distributed computing sessions (server generates as well as receives session requests), as opposed to the unidirectional request/response flows within the server for HTTP sessions (server primarily receives session requests), by making connections $620_1$ through $620_M$ and $621_1$ through $621_M$ quasi permanent, significant worker node resources are not wasted executing connection setup procedures across the request/response shared memory for distributed computing sessions.

Moreover, when different software programs are engaged in a session there tends to be more tolerance (e.g., from the perspective of an end user) if the session is slow or dropped than when different pieces of the same software program are engaged in a session that is slow or dropped. By making connections $620_1$ through $620_M$ and $621_1$ through $621_M$ quasi permanent, shared memory resources are quasi-permanently reserved for the carrying out of distributed computing sessions which should result in less delay and/or blocking of these sessions.

Further still, the lifetime of distributed computing sessions tend to be very long (because they tend to be very active when setup), and, they tend to be "bi-directional" in the sense that either broker is capable of generating a request for the other broker (whereas non-distributed computing sessions tend to use a strict "client-server" model in which only one end of the connection generates responses and only the other end of the connection generates requests. Rather than cause a new connection to be established for each request/response cycle where the direction of the request and the direction of the response is a concern, a quasi-permanent bi-directional connection is better suited for distributed computing sessions.

Eve further, at least some distributed computing protocols (e.g., IIOP and RMI-P4) permit request and/or response data from different sessions (e.g., involving different clients) to be sent over a same connection over a network (e.g., network 601, network 610). Instantiating a quasi-permanent connection through shared memory to a worker node for "all" distributed computing session data is harmonious with this approach because incoming and/or outgoing traffic for multiple sessions to/from a worker node will simply "flow" from a network connection through the shared memory into the worker node; and/or, from the worker node through the shared memory and into a network connection.

Another feature observed in FIG. 6 is that the connection mangers 608, 609 of both servers 604, 605 handle both distributed and non-distributed sessions alike. For example, with respect to server 604, connection manager 608 handles HTTP sessions whose incoming requests correspond to flow 606 as well as distributed computing sessions whose incoming and/or outgoing requests correspond to flow 611. Similarly, with respect to server 605, connection manager 609 handles HTTP sessions whose incoming requests correspond to flow 607 as well as distributed computing sessions whose incoming and/or outgoing requests correspond to flow 611.

Thus, the connection managers 608, 609 of cluster 600 could collectively support a situation in which a first HTTP session is being handled by server 604 (e.g., via flow 606) and a second HTTP session is being handled by server 605 (e.g., via flow 607), and, servers 604 and 605 are engaged in a distributed computing session (e.g., via flow 611).

For example, if worker node $619_1$ is handling both the HTTP session and distributed computing session for server 604, connection 613 can be viewed as corresponding to the request/response shared memory connection that is established for a particular request/response cycle of the HTTP session; and, connection $620_1$ can be viewed as the quasi-permanent request/response shared memory connection used for handling worker node $619_1$'s distributed computing sessions such as the distributed computing session that servers 604 and 605 are engaged in.

Likewise, if worker node $629_1$ is handling both the HTTP session and distributed computing session for server 605, connection 614 can be viewed as corresponding to the request/response shared memory connection that is established for a particular request/response cycle of the HTTP session; and, connection $621_1$ can be viewed as the quasi-permanent request/response shared memory connection used for handling worker node $629_1$'s distributed computing sessions such as the distributed computing session that servers 604 and 605 are engaged in.

Figure 7:
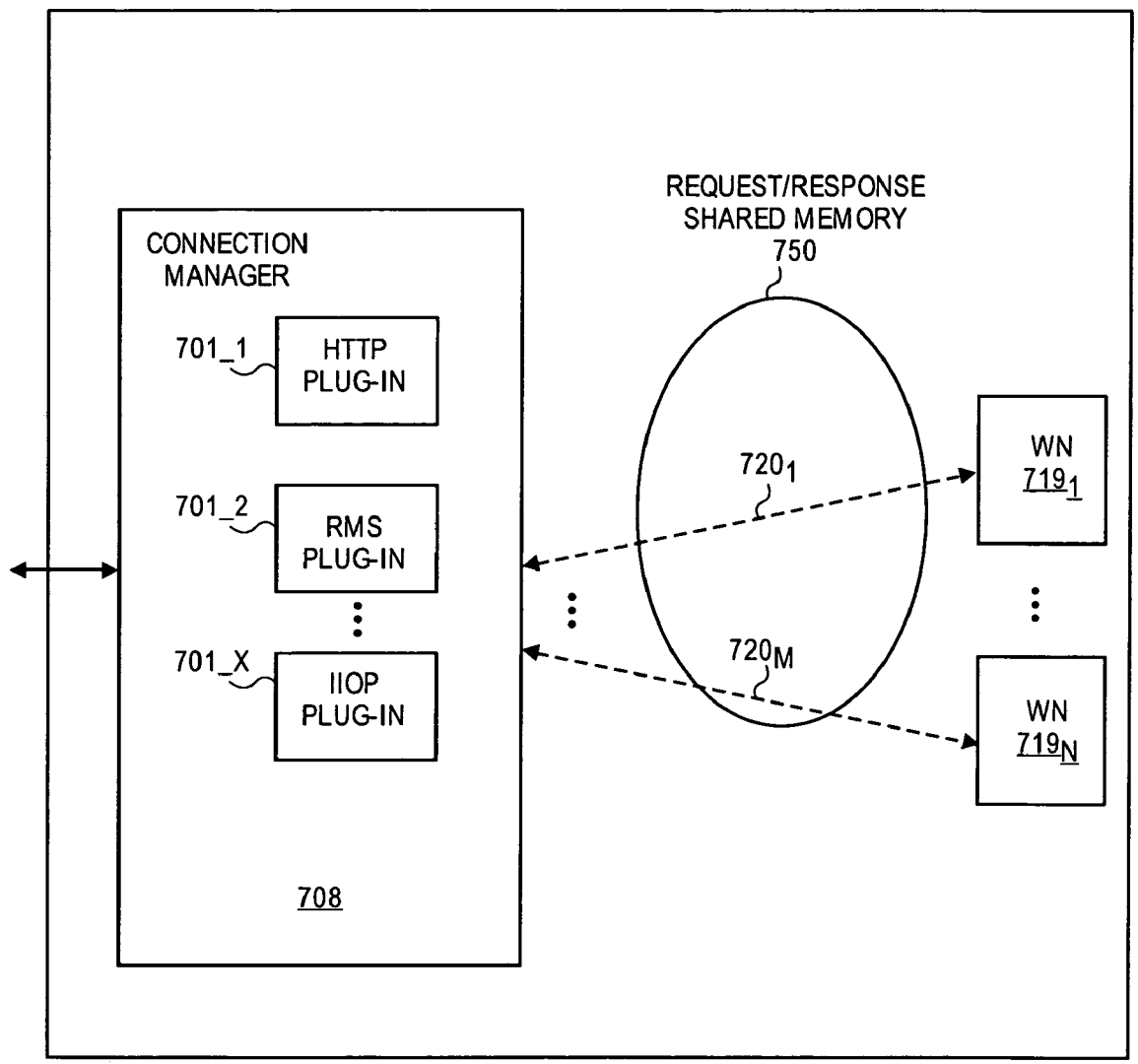
FIG. 7 shows a connection manager having protocol specific plug-ins.

FIG. 7 shows a connection manager 708 that is capable of handling both distributed computing sessions and non-distributed computing sessions. According to the connection manager design depicted in FIG. 7, the connection manager 708 includes a plug-in for the different types of sessions it may have to support the communications tasks of. A plug-in is an amount of program code that is dedicated to some kind of "specific" processing task. In the case of the connection manager 708 of FIG. 7, each plug-in performs specific tasks that are associated with a specific type of request/response communication protocol.

For example, in the case of FIG. 7, the connection manager 708 includes a first plug-in 701_1 for processing specific tasks associated with the HTTP protocol, a second plug-in 701_2 for processing specific tasks associated with the RMI protocol, ... and an Xth plug-in 701_X for processing specific tasks associated with the IIOP protocol. The specific tasks mentioned above are specific, for instance, at least in the sense that each different protocol tends to have its own unique packet header structure. Thus, in an embodiment, each one of the different plug-ins 701_1 through 701_X includes code that is able to "understand" received packet header information associated with its corresponding protocol, and, construct outgoing packet headers that conform to its corresponding protocol's defined structure.

Conceivably, a plug-in could be developed for each of the major non distributed computing request/response session protocols (such as HTTP and HTTPS), and, a plug-in could be developed for each of the major distributed computing system request/response session protocols (e.g., CORBA, IIOP, RMI, RMI/IIOP, RMI-P4, etc.). Plug-ins are also blocks of code that can be individually integrated into the connection manager 708. Here, according to one embodiment, the connection manager 708 is designed to have a specific type of interface/API through which it communicates with its various plug-ins. By designing plug-ins to communicate over this interface, the specific combination of plug-ins to be installed in the connection manager need not be defined until deployment time.

Generic tasks that can be applied to all incoming packets are performed by the connection manager 708 as a whole. For example, in an embodiment, in the case of inbound packets (that contain a request in the case of non distributed computing sessions; or, a request or a response in the case of distributed computing sessions), the connection manager 708 manages the queuing of inbound request packets and characterizes each received packet as pertaining to a specific type of protocol (e.g., HTTP, RMS, IIOP, etc.). The packet is then passed to the proper plug-in for processing.

In a further implementation, lower layer communication protocols that are generically applied across all packets irrespective of any specific type of request/response protocol that is to be applied to the packets individually, such as the Transmission Control Protocol (TCP) and/or Internet Protocol (IP) may be performed by the connection manager 708 as well.

Figure 8:
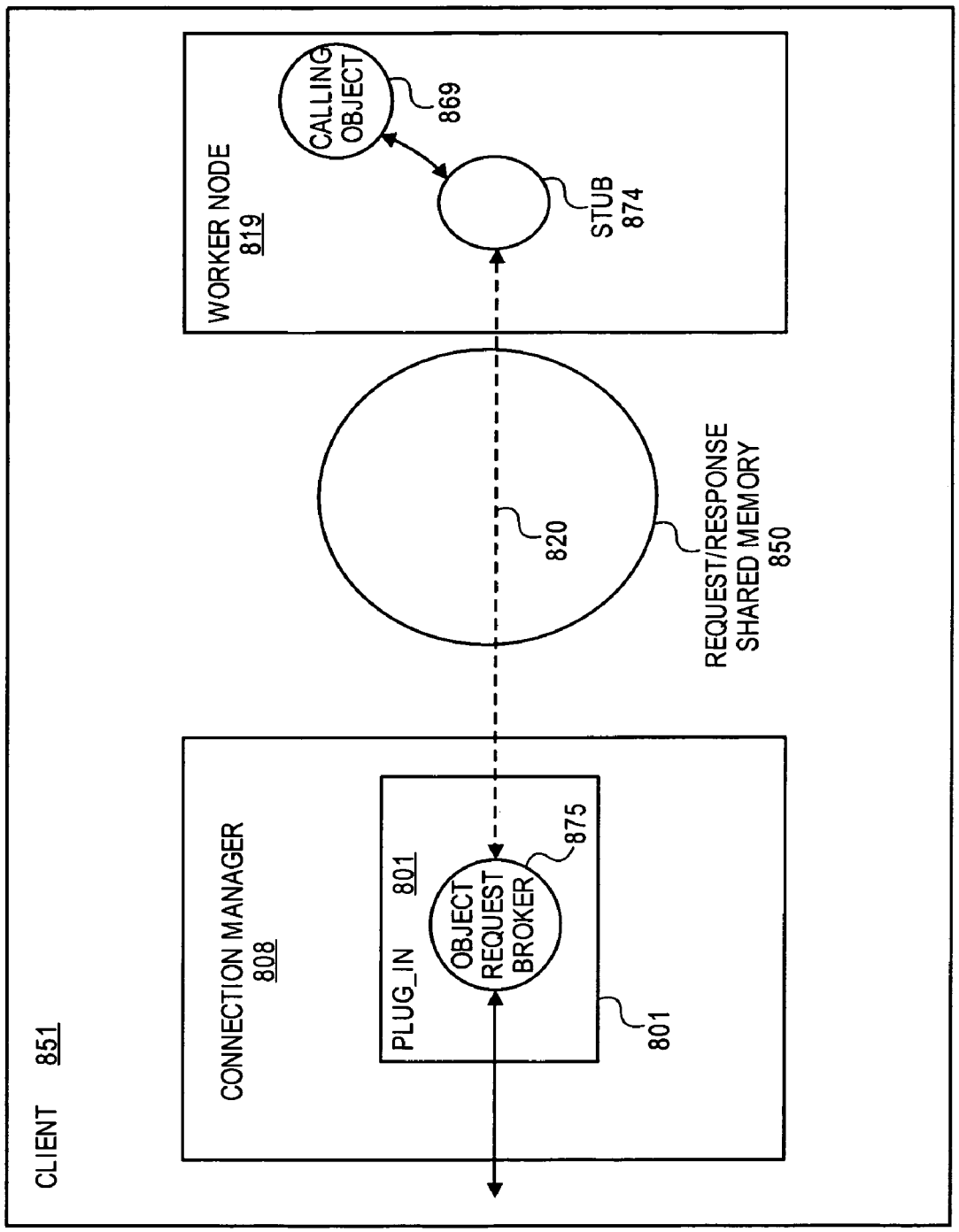
FIG. 8 shows a model for implementing a client side distributed computing session with a connection manager having a plug-in that supports the particular distributed computing session protocol being employed.
Figure 9:
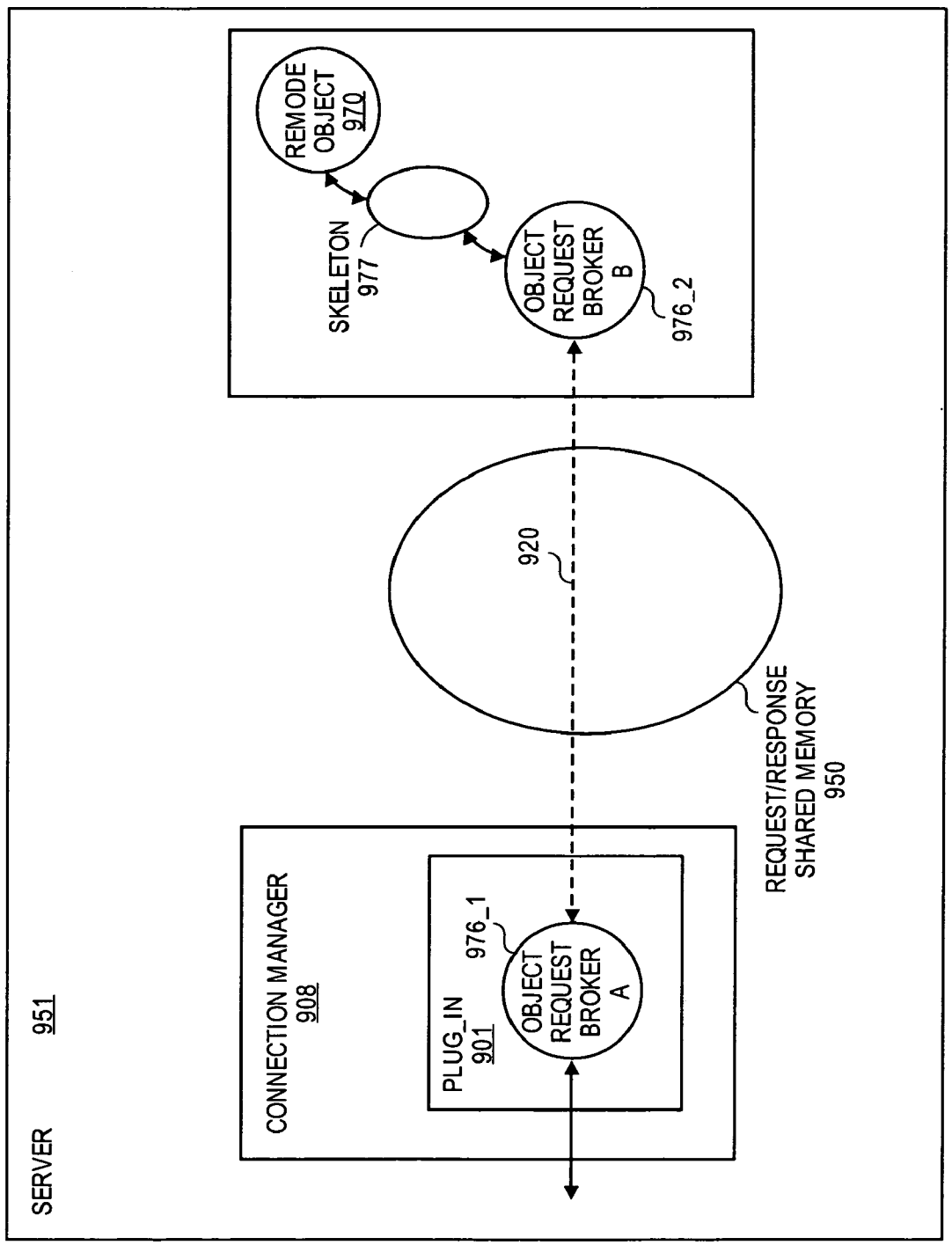
FIG. 9 shows a model for implementing a server side distributed computing session with a connection manager having a plug-in that supports the particular distributed computing session protocol being employed.

FIG. 7 also shows quasi-permanent connections $720_1$ through $720_M$ established through request/response shared memory 750 between the connection manager 708 and M different worker nodes $719_1$ through $719_M$, respectively. FIGS. 8 and 9 explore some possible models for implemented a distributed computing session with a connection manager plug-in.

FIG. 8 shows a model that can be implemented on the "client-side" 851 of a distributed computing session (e.g., the computing system where the calling object 869 resides). According to the depiction of FIG. 8, the calling object 869 and stub 874 are implemented on the worker node 819. The stub 874 communicates to the connection manager 808 plug-in 801 over the quasi permanent connection 820 established through the request/response memory 850. Here, as observed in FIG. 8, the plug-in 801 essentially performs the object request brokering function 875 on the client-side in the outgoing (request transmission) direction.

The client side object request brokering function on the client side may include various tasks such as any one or more of the following: 1) construction of a request packet data structure (that includes a method call to a remote object) consistently with a specific distributed computing system protocol that the plug-in corresponds to (e.g., CORBA, IIOP, RMI, RMI/IIOP, RMI-P4, etc.); 2) serialization of a request packet data structure if permitted/mandated by the specific distributed computing system protocol; 3) marshalling of data format type from that used on the worker node 819 to that used by the server side worker node and/or the distributed computing session communication protocol that is executed between the client side and server side.

In another "client-side" implementation, the object request brokering function is essentially split such that a first portion of the object request brokering function is executed by the connection manager 808 and a second portion of the object request brokering function is executed by the worker node 819. According to a further implementation, the first portion mentioned above includes the transport layer tasks for the distributed computing session and the second portion mentioned above includes the data marshalling tasks for the distributed computing session.

FIG. 9 shows a model that can be implemented on the "server-side" 951 of a distributed computing session (e.g., the computing system where the remote object 970 resides). According to the depiction of FIG. 9, the remote object 970 and skeleton 977 are implemented on the worker node 919 along with a first portion 976_2 of the object request broker function that may do any one or more of the following: 1)

identifying and locating (or creating) the proper remote object 970 to execute the incoming method call; and, 2) passing the remote method call to the skeleton 977; 3) marshalling of data format type to that used on the worker node 919 from that used by the client worker node and/or the distributed computing session communication protocol that is executed between the client side and server side. In RMI-P4 implementations portion 976_2 would include the dispatcher object referred to in the Background discussion of FIG. 1e.

The worker node portion of the object request brokering function 976_2 communicates to the plug-in 901 over the quasi-permanent connection 920 established through the request/response memory 950. Here, as observed in FIG. 9, the plug-in 901 essentially performs another portion 976_1 of the object request brokering function that is performed on the server-side in the incoming (request reception) direction. Portion 976_1 may perform various tasks such as: 1) the deciphering of a request packet data structure (that includes a method call to the remote object 970) consistently with a specific distributed computing system protocol that the plug-in corresponds to (e.g., CORBA, IIOP, RMI, RMI/IIOP, RMI-P4, etc.); 2) de-serialization of a request packet data structure if permitted/mandated by the specific distributed computing system protocol; 3) marshalling of data format type to that used on the worker node 919 from that used by the client worker node and/or the distributed computing session communication protocol that is executed between the client side and server side.

Any of the servers described above may be Java 2 Enterprise Edition ("J2EE") server nodes which support Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

8.0 Closing Statements

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 10:
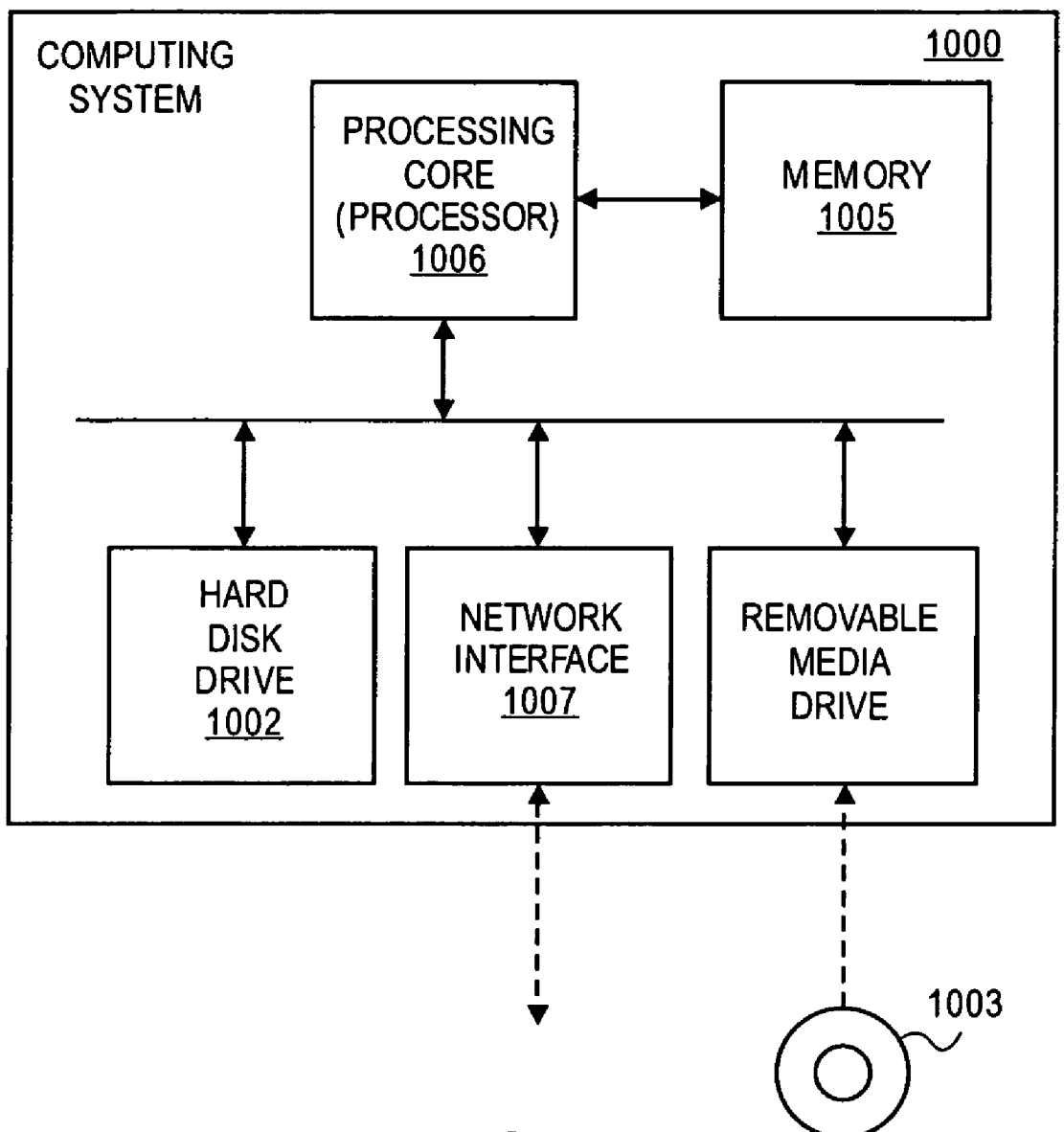
FIG. 10 shows an embodiment of a computing system.

FIG. 10 is a block diagram of a computing system 1000 that can execute program code stored by an article of manufacture. It is important to recognize that the computing system block diagram of FIG. 10 is just one of various computing system architectures. The applicable article of manufacture may include one or more fixed components (such as a hard disk drive 1002 or memory 1005) and/or various movable components such as a CD ROM 1003, a compact disc, a magnetic tape, etc. In order to execute the program code, typically instructions of the program code are loaded into the Random Access Memory (RAM) 1005; and, the processing core 1006 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 1006.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method comprising:
    establishing a session between a cluster of application servers and an external client;
    determining that said session is a distributed session, said distributed session involves bi-directional request and response flows;
    establishing a connection, associated with said distributed session, over a shared memory between a connection manager and a worker node, said shared memory, connection manager, and worker node being located within a first application server within said cluster of application servers, said shared memory accessible to multiple worker nodes within said first application server;
    receiving, at said connection manager, a first distributed computing request from a external client over a network;
    sending, from said connection manager to said worker node over said connection, said first distributed computing request containing a first method call to a first worker object, said first worker object instantiated on a virtual machine within said worker node, said first worker object being a communication endpoint between said first worker object and said external client;
    preparing a first response to said first distributed computing request on said virtual machine within said worker node;
    sending said first response from said worker node to said connection manager through said connection; and,
    sending, from said connection manager, said first response to said first external client;
    receiving, at said connection manager, a second distributed computing request from said external client over said network;
    sending, from said connection manager to said worker node over said connection, said second distributed computing request containing a second method call to a second worker object, said second worker object instantiated on said virtual machine, said second worker object being a communication endpoint between said second worker object and said external client;

preparing a second response to said second distributed computing request on said virtual machine within said worker node;

sending said second response from said worker node to said connection manager through said connection;

sending, from said connection manager, said second response to said external client establishing a second session between said cluster of application servers and a second external client;

determining that said second session is a non-distributed session;

establishing a second connection, associated with said non-distributed session, over said shared memory between said connection manager and said worker node;

sending, from said connection manager to said worker node through said second connection, a non distributed computing request containing a command for an application that is instantiated on said virtual machine of said worker node; and, tearing down said second connection in response to said worker node having responded to said non distributed computing request.

2. The method of claim 1 wherein said first and second distributed requests are formatted according to a protocol selected from the group consisting of:
an IIOP request;
an RMI request;
a CORBA request; and,
an RMI/IIOP request.

3. The method of claim 1 wherein said non distributed computing request is formatted according to a protocol selected from the group, consisting of:
an HTTP request; and,
an HTTPS request.

4. The method of claim 3 comprising:
said connection manager executing a session request/response communication protocol for said first distributed computing request; and,
invoking a first worker object's skeleton on said worker node.

5. The method of claim 1, wherein said second external client is a second application server of said cluster of application servers.

6. An article of manufacture including program code stored on a non-transitory machine readable medium which, when executed by a machine, causes the machine to perform a method, the method comprising:
establishing a session between a cluster of application servers and an external client;
determining that said session is a distributed session, said distributed session involves bidirectional request and response flows;
establishing a connection, associated with said distributed session, over a shared memory between a connection manager and a worker node, said shared memory, connection manager, and worker node being located within a first application server within said cluster of application servers, said shared memory accessible to multiple worker nodes within said first application server;
receiving, at said connection manager, a first distributed computing request from said external client over a network;
sending, from said connection manager to said worker node over said connection, said first distributed computing request containing a first method call to a first worker object, said first worker object instantiated on a virtual machine within said worker node, said first worker object being a communication endpoint between said first worker object and said external client;
preparing a first response to said first distributed computing request on said virtual machine within said worker node;
sending said first response from said worker node to said connection manager through said connection; and,
sending, from said connection manager, said first response to said first external client;
receiving, at said connection manager, a second distributed computing request from said external client over said network;
sending, from said connection manager to said worker node over said connection, said second distributed computing request containing a second method call to a second worker object, said second worker object instantiated on said virtual machine, said second worker object being a communication endpoint between said second worker object and said external client;
preparing a second response to said second distributed computing request on said virtual machine within said worker node;
sending said second response from said worker node to said connection manager through said connection;
sending, from said connection manager, said second response to said external client
establishing a second session between said cluster of application servers and a second external client;
determining that said second session is a non-distributed session;
establishing a second connection, associated with said non-distributed session, over said shared memory between said connection manager and said worker node;
sending, from said connection manager to said worker node through said second connection, a non distributed computing request containing a command for an application that is instantiated on said virtual machine of said worker node; and,
tearing down said second connection in response to said worker node having responded to said non distributed computing request.

7. The article of manufacture of claim 6 wherein said first and second distributed requests are formatted according to a protocol selected from the group consisting of:
an IIOP request;
an RMI request;
a CORBA request; and,
an RMI/IIOP request.

8. The article of manufacture of claim 6 wherein said non distributed computing request is formatted according to a protocol selected from the group, consisting of:
an HTTP request; and,
an HTTPS request.

9. The article of manufacture of claim 8 wherein said method further comprises:
said connection manager executing a session request/response communication protocol for said first distributed computing request; and,
invoking a first worker object's skeleton on said worker node.

10. The article of manufacture of claim 9 wherein said first and second distributed requests are formatted according to a protocol selected from the group consisting of:
- an IIOP request;
- an RMI request;
- a CORBA request; and,
- an RMI/IIOP request.

11. A computing system comprising a machine, said computing system also comprising instructions disposed on a non-transitory computer readable storage medium, said instructions causing said machine to:
- establish a session between a cluster of application servers and an external client;
- determine that said session is a distributed session, said distributed session involves bidirectional request and response flows;
- establish a connection, associated with said distributed session, over a shared memory between a connection manager and a worker node, said shared memory, connection manager, and worker node being located within a first application server within said cluster of application servers, said shared memory accessible to multiple worker nodes within said first application server;
- receive, at said connection manager, a first distributed computing request from said external client over a network;
- send, from said connection manager to said worker node over said connection, said first distributed computing request containing a first method call to a first worker object, said first worker object instantiated on a virtual machine within said worker node, said first worker object being a communication endpoint between said first worker object and said external client;
- prepare a first response to said first distributed computing request on said virtual machine within said worker node;
- send said first response from said worker node to said connection manager through said connection; and,
- send, from said connection manager, said first response to said external client;
- receive, at said connection manager, a second distributed computing request from said external client over said network;
- send, from said connection manager to said worker node over said connection, said second distributed computing request containing a second method call to a second worker object, said second worker object instantiated on said virtual machine, said second worker object being a communication endpoint between said second worker object and said external client;
- prepare a second response to said second distributed computing request on said virtual machine within said worker node;
- send said second response from said worker node to said connection manager through said connection;
- send, from said connection manager, said second response to said external client
- establish a second session between said cluster of application servers and a second client;
- determine that said second session is a second non-distributed session;
- establish a second connection, associated with said second non-distributed session, over said shared memory between said connection manager and said worker node;
- send, from said connection manager to said worker node through said second connection, a non distributed computing request containing a command for an application that is instantiated on said virtual machine of said worker node; and,
- tear down said second connection in response to said worker node having responded to said non distributed computing request.

12. The computing system of claim 11 wherein said first and second distributed requests are formatted according to a protocol selected from the group consisting of:
- an IIOP request;
- an RMI request;
- a CORBA request; and,
- an RMI/IIOP request.

13. The computing system of claim 11 wherein said non distributed computing request is formatted according to a protocol selected from the group, consisting of:
- an HTTP request; and,
- an HTTPS request.

14. The computing system of claim 13 wherein said instructions disposed on a non-transitory computer readable storage medium further cause said computer to:
- execute, within said connection manager, a session request/response communication protocol for said first distributed computing request; and,
- invoke a remote object's skeleton on said worker node.

15. A method, comprising:
- establishing a first session to manage computing requests received by a cluster of application servers;
- establishing a second session to manage computing requests received by said cluster of application servers;
- determining that said first session is a distributed session and said second session is a non-distributed session;
- establishing a quasi-permanent connection, associated with said distributed session, over a shared memory between a connection manager and a first worker node operating on a common server, said shared memory accessible to multiple worker nodes, and wherein said quasi-permanent connection remains active through multiple request/response cycles;
- establishing a second connection, associated with said non-distributed session, over said shared memory between said connection manager and a second worker node operating on said common server;
- receiving at a dispatcher a first distributed computing request containing a first method call to a first worker object, said first worker node is running an instance of said first worker object;
- sending, from said dispatcher to said connection manager, said first distributed computing request over a network connection;
- sending, from said connection manager to said first worker node over said quasi-permanent connection, said first distributed computing request;
- receiving at said dispatcher a second non-distributed computing request containing a second method call to a second worker object, said second worker node is running an instance of said second worker object;
- sending, from said dispatcher to said connection manager, said second non-distributed computing request over a network connection;
- sending, from said connection manager to said second worker node over said quasi-permanent connection, said second non-distributed computing request.

16. The method of claim 15, further comprising:
- receiving at said connection manager a third distributed computing request containing a third method call to said first work object over a network connection, said third distributed computing request received from an application server within said cluster of application servers;

sending, from said connection manager to said first worker node over said quasi-permanent connection, said third distributed computing request.

17. A method, comprising:

establishing a first session to manage computing requests received by a cluster of application servers;

determining that said first session is a distributed session, said distributed session involves bi-directional request and response flows;

establishing a second session to manage non-distributed computing requests received by said cluster of application servers;

establishing a quasi-permanent connection, associated with said distributed session, between a connection manager and a virtual machine instance running on a common server within said cluster of application servers, said quasi-permanent connection established within a share memory on said common server;

establishing a second connection, associated with said second session, between said connection manager and said virtual machine instance within said shared memory;

sending, from said connection manager to said virtual machine instance over said quasi-permanent connection, a first distributed computing request;

receiving, from said virtual machine instance at said connection manager over said quasi-permanent connection, a response to said first distributed computing request;

sending, from said connection manager to said virtual machine instance over said second connection, a first non-distributed computing request;

receiving, from said virtual machine instance at said connection manager over said second connection, a response to said first non-distributed computing request;

closing said second connection associated with said second session;

sending, from said connection manager to said virtual machine instance over said quasi-permanent connection, a second distributed computing request;

receiving, from said virtual machine instance at said connection manager over said quasi-permanent connection, a response to said second distributed computing request; and closing said first session;

tearing down said quasi-permanent connection between said connection manager and said virtual machine instance;

wherein quasi-permanent connections remain active through multiple request/response cycles.

* * * * *